(12) United States Patent
Gibson et al.

(10) Patent No.: US 10,180,506 B2
(45) Date of Patent: Jan. 15, 2019

(54) MULTI-SPECTRAL X-RAY DETECTION APPARATUS

(71) Applicant: IBEX Innovations Ltd., Sedgefield, Durham (GB)

(72) Inventors: Gary Gibson, Sedgefield (GB); Paul Scott, Sedgefield (GB)

(73) Assignee: IBEX Innovations Ltd., Sedgefield, Durham (GB)

( * ) Notice: Subject to any disclaimer, the term of this patent is extended or adjusted under 35 U.S.C. 154(b) by 0 days.

(21) Appl. No.: 14/891,459

(22) PCT Filed: May 16, 2014

(86) PCT No.: PCT/GB2014/051506
§ 371 (c)(1),
(2) Date: Nov. 16, 2015

(87) PCT Pub. No.: WO2014/184574
PCT Pub. Date: Nov. 20, 2014

(65) Prior Publication Data
US 2016/0084973 A1    Mar. 24, 2016

(30) Foreign Application Priority Data
May 16, 2013    (GB) .................................. 1308851.3

(51) Int. Cl.
*A61B 6/00* (2006.01)
*A61B 6/03* (2006.01)
(Continued)

(52) U.S. Cl.
CPC ................ *G01T 1/366* (2013.01); *G01T 1/24* (2013.01); *G01T 1/2985* (2013.01); *G21K 1/10* (2013.01)

(58) Field of Classification Search
CPC ........ G21K 1/10; A61B 6/4035; A61B 6/032; A61B 6/06; A61B 6/482
(Continued)

(56) References Cited

U.S. PATENT DOCUMENTS 3,950,613 A    4/1976    Macovski
3,965,358 A    6/1976    Macovski
(Continued)

FOREIGN PATENT DOCUMENTS

DE    102007058447 A1    6/2009
EP        1063538 A2    6/2000
(Continued)

OTHER PUBLICATIONS

PCT International Search Report, Application No. PCT/GB2014/051524, dated Sep. 26, 2014.
(Continued)

*Primary Examiner* — Don Wong
(74) *Attorney, Agent, or Firm* — MacMillan, Sobanski & Todd, LLC

(57) ABSTRACT

An x-ray X-ray imaging apparatus includes an x-ray detector (3) that is configured to convert incident x-ray wavelength photons directly into electronic signals, a position for a material under test (2), an x-ray source (1), and a structure (4) configured to perturb an x-ray energy spectrum, each lying on a common axis. The x-ray source (1) is arranged to direct an x-ray energy spectrum along the common axis to impinge upon the member, the structure (4) configured to perturb the x-ray energy spectrum, and positioned material under test (2). The structure (4) lies between the x-ray source (1) and the member to one side of the position for material under test (2) intersecting the common axis, and the structure (4) includes at least three adjacent regions, each region
(Continued)

different to immediately adjacent regions and configured to perturb the x-ray energy spectrum differently.

45 Claims, 20 Drawing Sheets

(51) Int. Cl.
*G01T 1/36* (2006.01)
*G01T 1/24* (2006.01)
*G01T 1/29* (2006.01)
*G21K 1/10* (2006.01)

(58) Field of Classification Search
USPC .................................. 378/70, 71, 156, 147
See application file for complete search history.

(56) References Cited

U.S. PATENT DOCUMENTS

| | | | |
|---|---|---|---|
| 5,841,835 A * | 11/1998 | Aufrichtig | A61B 6/583 378/204 |
| 6,231,231 B1 * | 5/2001 | Farrokhnia | A61B 6/583 378/204 |
| 7,200,201 B2 | 4/2007 | Unger et al. | |
| 7,382,853 B2 | 6/2008 | Arenson et al. | |
| 8,155,729 B1 | 4/2012 | Hsieh et al. | |
| 8,199,875 B2 | 6/2012 | Chandra et al. | |
| 8,243,875 B2 | 8/2012 | Xu et al. | |
| 8,311,182 B2 | 11/2012 | Chandra et al. | |
| 8,363,779 B2 | 1/2013 | Chandra et al. | |
| 8,378,310 B2 | 2/2013 | Bornefalk et al. | |
| 8,406,373 B2 | 3/2013 | Graham et al. | |
| 8,571,178 B2 * | 10/2013 | Sendai | A61B 6/4042 378/157 |
| 2014/0044234 A1 * | 2/2014 | Hashimoto | A61B 6/4291 378/62 |

FOREIGN PATENT DOCUMENTS

| | | |
|---|---|---|
| EP | 1192901 A1 | 4/2002 |
| JP | S53135590 A | 11/1978 |
| JP | S6398583 A | 4/1988 |
| JP | H0868864 A | 3/1996 |
| JP | 2009018154 A | 1/2009 |
| WO | 2004054329 A2 | 6/2004 |
| WO | 2004/091405 A1 | 10/2004 |
| WO | 2006044692 A2 | 4/2006 |
| WO | 2008068690 A2 | 6/2008 |
| WO | 2008142446 A2 | 11/2008 |
| WO | 2009125211 A1 | 10/2009 |
| WO | 2009130492 A1 | 10/2009 |
| WO | 2010136790 A1 | 12/2010 |
| WO | 2011/110862 A1 | 9/2011 |
| WO | 2011110862 A1 | 9/2011 |
| WO | 2012063169 A1 | 5/2012 |

OTHER PUBLICATIONS

PCT International Search Report, Application No. PCT/GB2014/051506, dated Sep. 4, 2014.
PCT International Search Report, Application No. PCT/GB2014/051525, dated Sep. 9, 2014.
Patent Act 1977: Search Report under Section 17, Application No. GB1408714.2, dated Jan. 15, 2015.
Patent Act 1977: Examination Report under Section 18(3), Application No. GB1408714.2, dated Jul. 28, 2017.
Patent Act 1977: Examination Report under Section 18(3), Application No. GB1408714.2, dated Mar. 27, 2018.
Japanese Office Action, English Translation, Application No. JP2016-513442, dated Mar. 22, 2018.

* cited by examiner

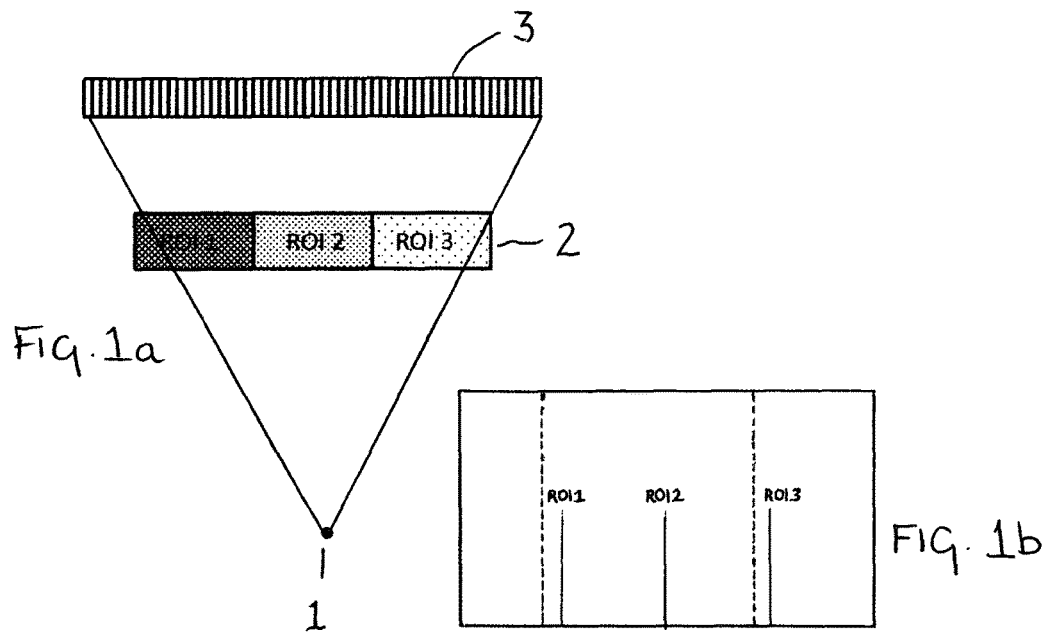
Fig. 1a
Fig. 1b
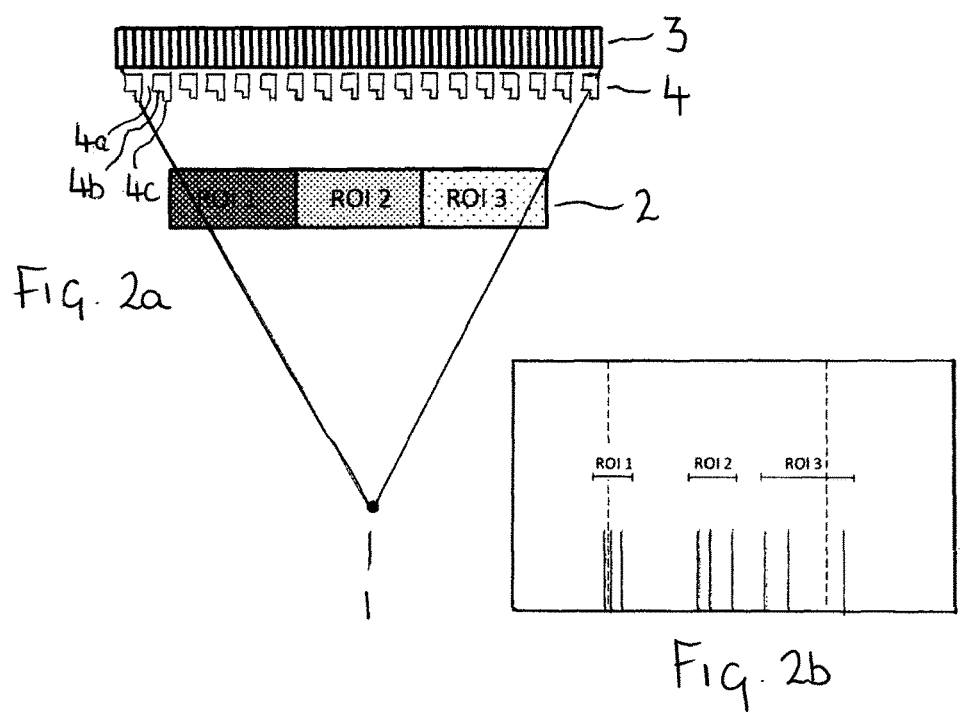
Fig. 2a
Fig. 2b

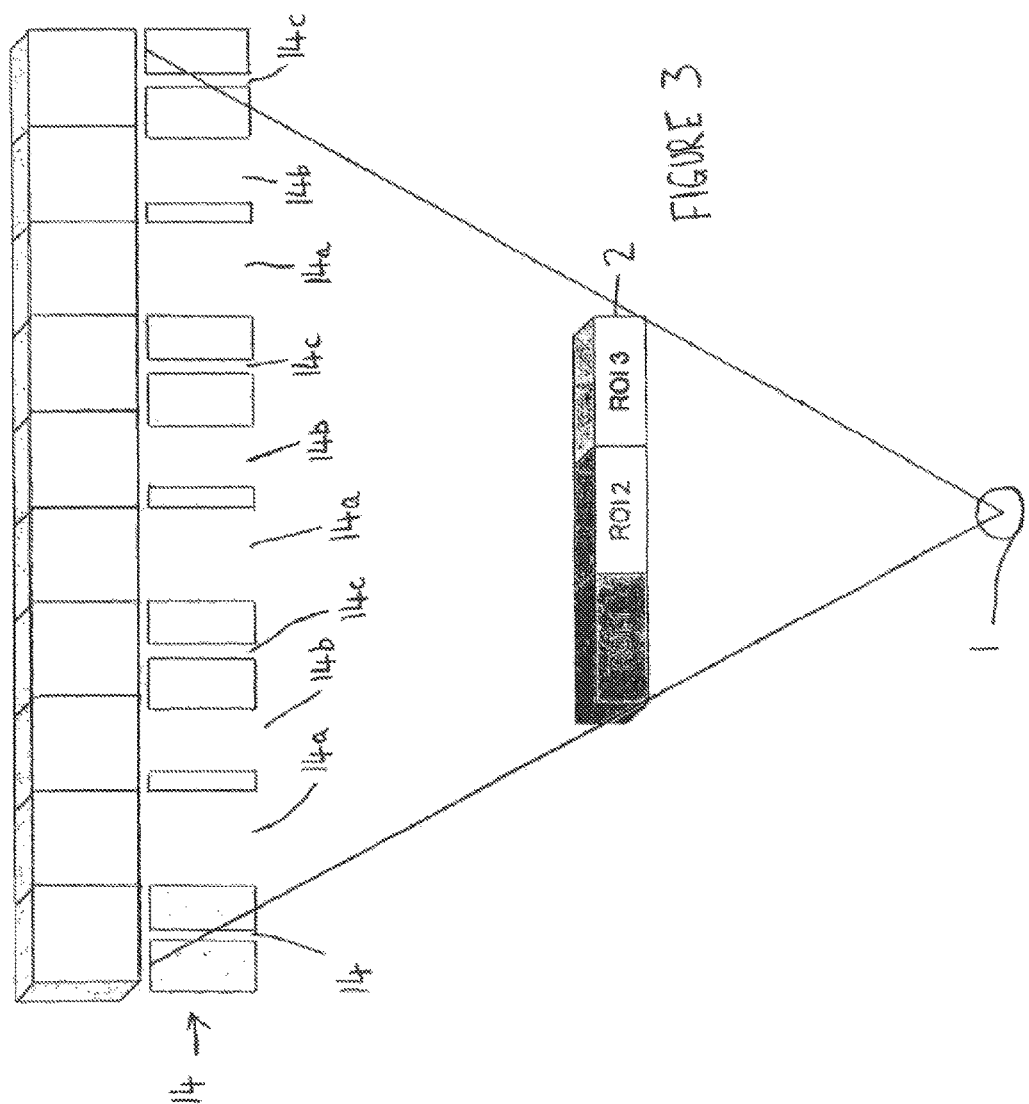

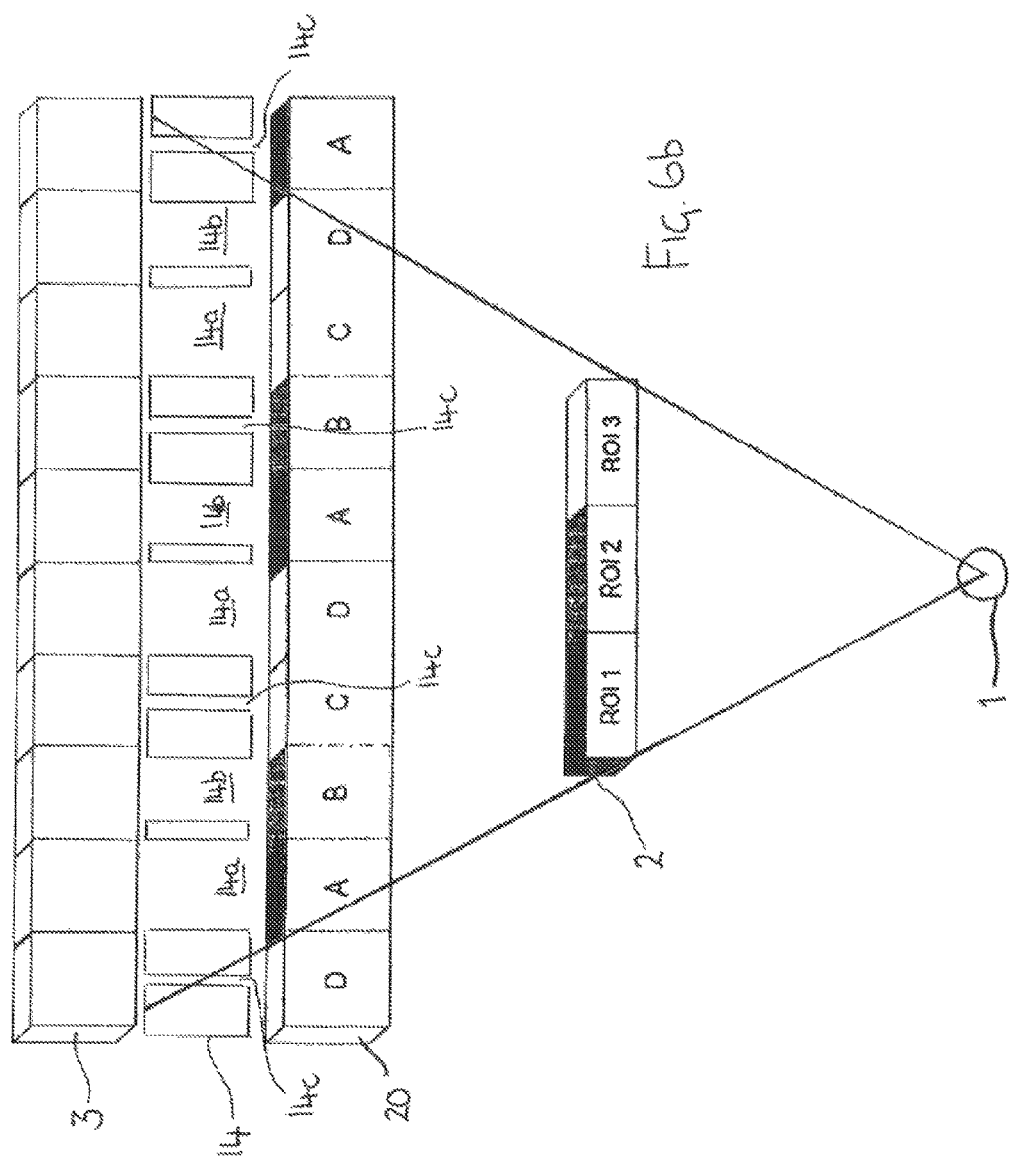

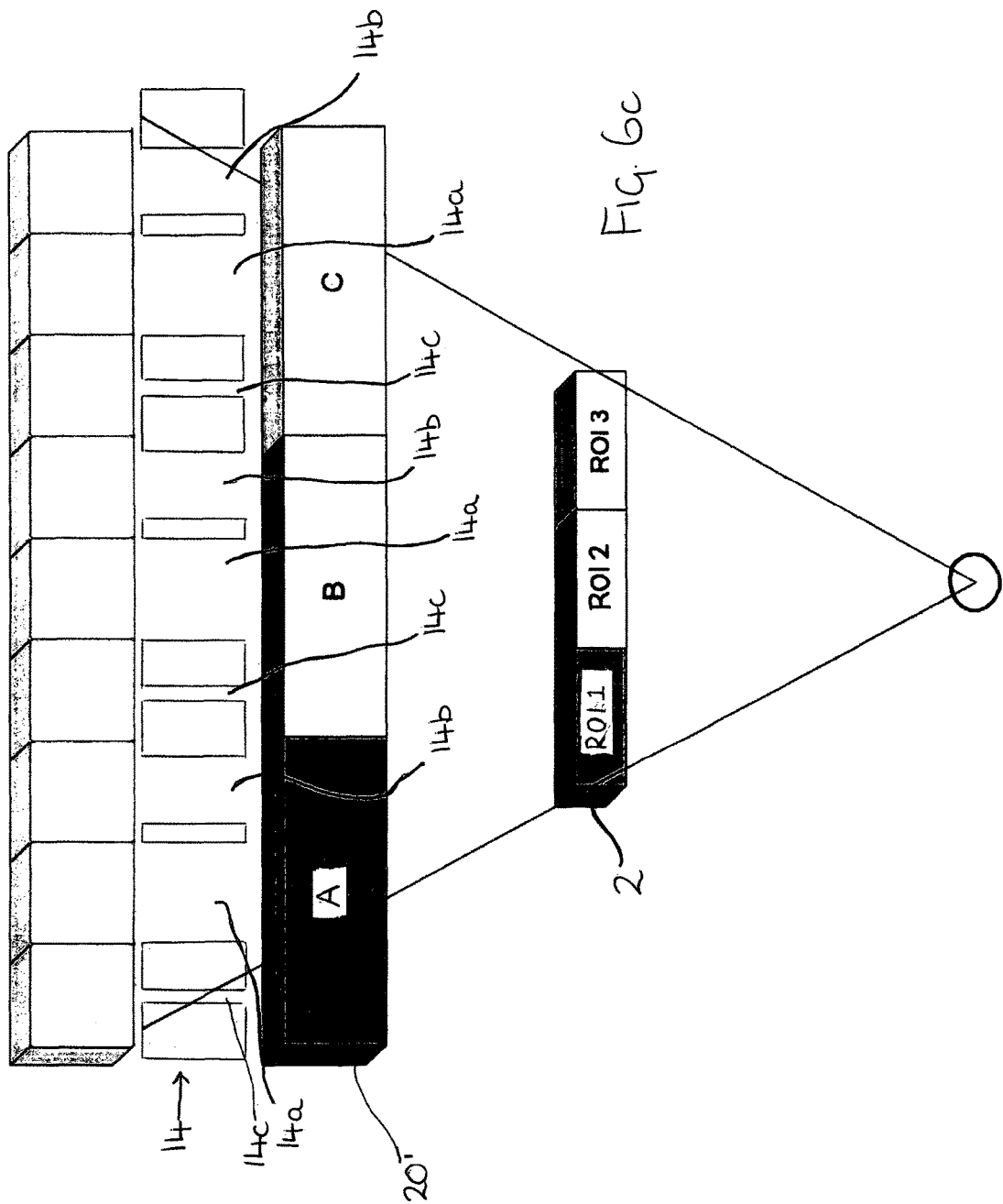

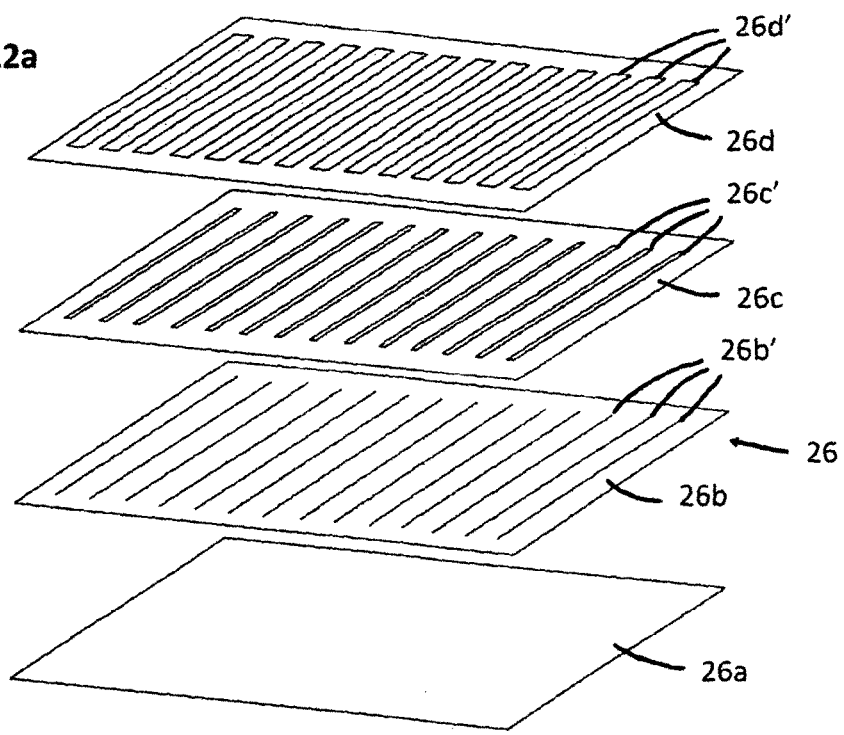
FIGURE 12a
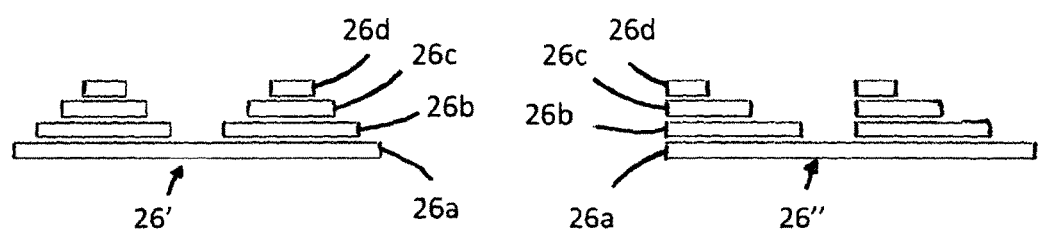

FIGURE 15b
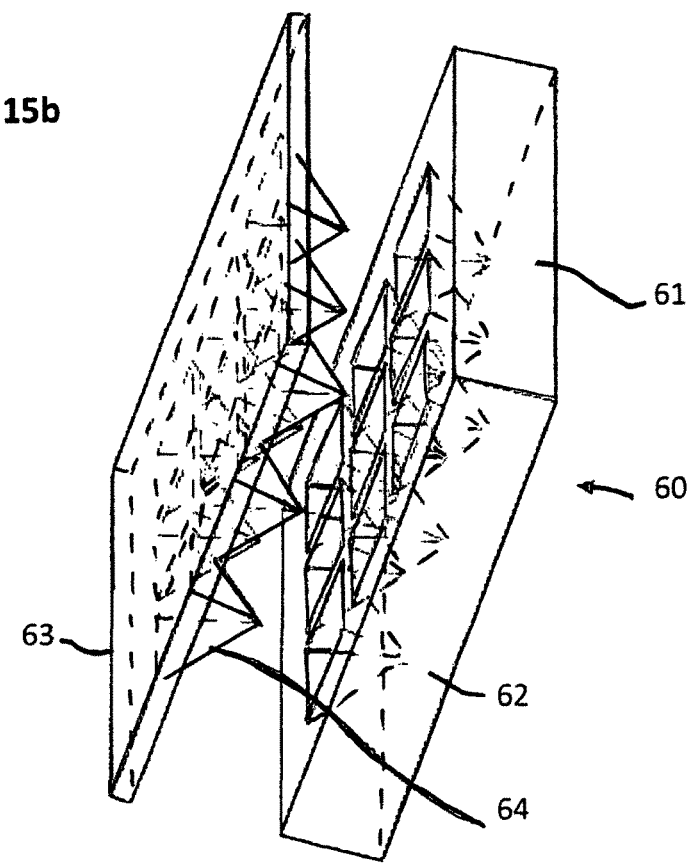
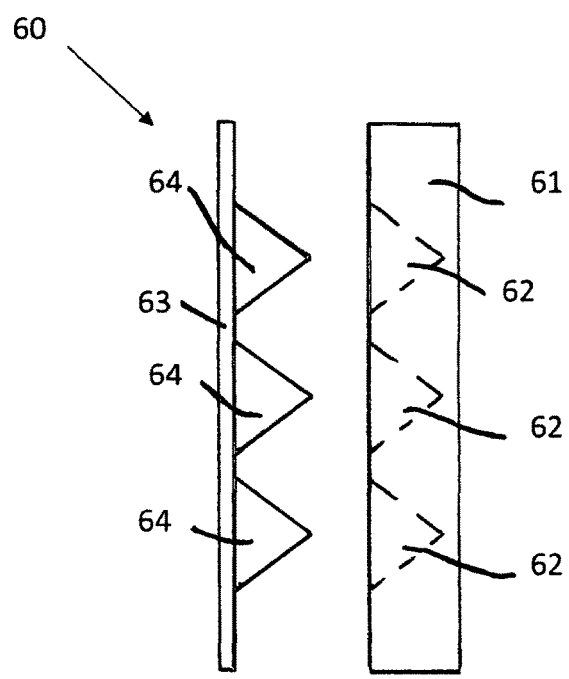

MULTI-SPECTRAL X-RAY DETECTION APPARATUS

CROSS-REFERENCE TO RELATED APPLICATIONS

This application is the National Phase of International Application PCT/GB2014/051506 filed May 16, 2014, which designated the U.S. That International Application was published in English under PCT Article 21(2) on Nov. 20, 2014 as International Publication Number WO 2014/184574A1. PCT/GB2014/051506 claims priority to U.K. Application No. 1308851.3 filed May 16, 2013. Thus, the subject nonprovisional application also claims priority to U.K. Application No. 1308851.3 filed May 16, 2013. The disclosures of both applications are disclosure of that application is incorporated herein by reference.

FIELD OF THE INVENTION

The present invention relates to x-ray detection apparatus and in particular to an apparatus that provides for the multi-spectral analysis of materials.

BACKGROUND OF THE INVENTION

An x-ray tube outputs radiation across a wide range of energy bands, the distribution of the energy being defined by the accelerating voltage applied to the tube. When x-rays impact a material, they are absorbed as they pass through. X-rays of different energies are absorbed differently which means that the initial x-ray intensity profile changes. Different materials cause a distinctive change in shape of the x-ray intensity spectra and thus if the spectra can be recorded with sufficient accuracy, it is possible to predict the material that the x-rays have passed through.

While the mass absorption coefficient depends upon both the material type and also the energy of the incident photons, the mass absorption coefficient is independent of material thickness and density. Hence, faced with a resultant spectrum, and knowing the starting spectrum, it is possible to deduce the mass absorption coefficient values and hence the material type the x-rays have passed through.

The detection of x-rays falls into two categories. The first is direct detection, where the energy of an x-ray photon impinging upon a particular material, such as CdTe or Ge is absorbed and converted into an electrical signal. The second is indirect detection in which an intermediate scintillator material first converts x-ray energy into visible light which is subsequently converted into an electrical signal by a detector.

Direct detection has particular application in the identification of materials.

X-ray detectors are typically operated in one of three modes: pulse mode, current mode and voltage mode. Current mode is used in cases where event rates are high and voltage mode is used for high energy detection. Pulse mode operation is widely preferred as it preserves amplitude, counting and timing information for individual pulses.

Direct detection using pulse mode allows materials to be identified and is described in a number of published patent applications. For example:

The international patent application published under number WO2008/142446 describes energy dispersive x-ray absorption spectroscopy in scanning transmission mode involving the calculation of the intensity ratios between successive frequency bands;

The international patent application published under number WO2009/125211 describes an imaging apparatus and method;

The international patent application published under number WO2009/130492 describes the determination of composition liquids; and The international patent application published under number WO2010/136790 describes a method for the identification of materials in a container.

Whilst the techniques set out in the patent applications mentioned above are effective, the detectors themselves present limitations.

Pulse mode detection provides counting and energy resolution information in the form of an x-ray spectrum. This x-ray spectrum, also referred to as a pulse height spectrum is typically produced by measuring the height of each pulse from the detector. A spectrum of the total number of detected counts per energy range (typically referred to as energy bins) is produced with the width of any given energy bin configured according to limitations such as detector resolution, electronics selection and input count rate.

The pulse mode detection technique has been adopted in many materials identification applications because of the preservation of photon counting and energy information for individual pulses.

A major issue limiting the materials sensitivity of energy dispersive detectors, the ability of the detector to detect different materials, is that these detectors have count rate limitations. Unlike current or voltage mode detectors where the time averaged current or voltage is measured, the electronics used in pulse mode detection must analyse the pulse from each x-ray interaction with the detector. As these pulses have a finite width in the time domain they begin to overlap as the count rate is increased. This phenomenon is known as pulse pile up and distorts the x-ray spectrum.

In cases where samples exhibit large region to region variation in thickness or density it is possible that some detectors in an array (pixels) may see very high count rates while neighbouring pixels may see very low count rates. Pixels directed along the path of low density and/or thin sample path lengths may see rates which are in the extreme pulse pile up regime, leading to distortion of the energy spectrum.

The obvious way of avoiding such pulse pile up problems is to reduce the input count rate by reducing the beam power or increasing the source to detector separation. The problem with a global reduction in x-ray flux is that highly absorbing regions fall into the measurement noise floor and become indistinguishable. Contributions to the measurement noise floor include spurious dark counts and Poisson noise, both of which become significant at low count rates. This makes global changes in x-ray flux undesirable and requires multiple shots to be taken in order to resolve each contrast level. This approach is time consuming and increases the absorbed x-ray dose.

In materials identification applications users often require the shortest possible measurement time. Nowhere is this more important than in security scanning where, for example, high volumes of luggage must be scanned rapidly. This results in short integration times which in turn result in either higher Poisson errors or spectral distortion due to pulse pile up. These distortions in the energy spectrum limit the sensitivity of materials identification techniques, therefore limiting the materials which can be distinguished. Consequently, minimising spectral distortion is at the expense of counting errors and measurement time.

Another way to avoid such pulse pile up is to reduce the width of the pulse produced in the detector electronics thereby minimising the probability of two pulses piling up. This leads to errors in the measurement of the pulse height (and therefore x-ray energy) known as ballistic deficit and the processing of such pulses requires faster analogue to digital sampling, lower noise amplifiers and low capacitance, fast rise time electronics. All of these features add to the cost and complexity of the detector electronics.

SUMMARY OF THE INVENTION

According to a first aspect of the invention there is provided an x-ray imaging apparatus, the apparatus including an x-ray detector comprising a member configured to convert incident x-ray wavelength photons directly into an electronic signal, a position for a material under test, an x-ray source, and a structure configured to perturb an x-ray energy spectrum, each lying on a common axis, wherein the x-ray source is arranged to direct an x-ray energy spectrum along the common axis to impinge upon the member, the structure configured to perturb the x-ray energy spectrum, and a positioned material under test, wherein said structure lies between the x-ray source and the member and to one side of the position for material under test, the said structure intersecting the common axis, wherein the said structure comprises at least three adjacent regions, each region different to immediately adjacent regions and configured to perturb the x-ray energy spectrum differently.

Advantageously, the regions lie laterally of one another, and preferably the structure comprises a plurality of regions lying laterally of one another, and preferably in two orthogonal directions.

Advantageously, the plurality of regions is formed in an array, and the array may repeat itself in the structure. The structure may include a multiplicity of such arrays. For example, the plurality of regions may comprise a three by three array of nine regions.

Preferably, the structure is planar or non-planar. The structure may be curved in at least one plane.

Preferably, the difference between adjacent regions is the thickness of the material of the structure in adjacent regions.

The structure may include a plurality of protrusions or depressions, the thickness of said protrusions or depressions changing in at least one direction thereof, each protrusion or depression providing at least three adjacent regions configured to perturb the x-ray energy spectrum.

Preferably, the protrusions or depressions are pyramidal in shape.

The structure may comprise a non-metallic layer having a multiplicity of depressions formed therein, each depression filled with metal. Preferably, the structure comprises a first non-metallic layer having a multiplicity of depressions formed therein and a second metallic layer including a corresponding number of protrusions each protrusion filling a corresponding depression.

The second layer may cover the surface of the first layer in which the openings to the depressions are situated.

Adjacent depressions or protrusions may be separated from one another by x-ray perturbing material and wherein the material separating adjacent depressions or protrusions may constitute one of the at least three regions.

The non-metallic layer may be formed of silicon.

The difference between adjacent regions may be the material from which the individual adjacent regions of the structure are formed.

The adjacent regions may differ in thickness and in the material from which they are made. For example, the structure may comprise a substrate of even thickness, and the individual regions may be formed on a surface thereof by building up discrete layers of material on adjacent regions. The number of layers and/or the materials of those layers may differ. Techniques such as PVD, electro-deposition or laser ablation may be used to form the individual regions.

In addition, the regional variation may be created by stacking layers of foils with cut-out regions one on top of each other so that the cut out regions stack in such a way to create a variety of thicknesses in a lateral sense.

Another alternative would be to stack a series of wire meshes together in a similar fashion to the foils such that variations in material thicknesses are formed. Preferably, the individual wires of each wire mesh are rectangular in cross-section. This is similar to techniques used to form neutral density filters.

Another alternative is to start with a certain thickness of material and cut out regions to create differing thicknesses. This could be done by laser micro-machining or ion-beam milling amongst the many techniques.

Where the material property of the structure, such as thickness of the structure or a part of the structure changes continuously rather than by steps, taking any point on the structure, if its property (thickness) is different to the thickness of the structure at an adjacent point, then those two points may each be considered to be regions configured to perturb the x-ray energy spectrum differently.

In some embodiments the x-ray detection apparatus includes or is associated with data recording means where visible wavelength photons are recorded.

In some embodiments the x-ray detection apparatus includes or is associated with a database of recorded information characteristic of known substances.

In some embodiments the x-ray detection apparatus includes or is associated with data processing software, and preferably, such data processing software is configured to perform processing steps to determine a material property of an object or substance.

Where any of the aforementioned data recording means, database, data processor and date processing software are not embodied in the apparatus they may be embodied an another apparatus to which the x-ray detector apparatus of the invention is connected.

According to a second aspect of the invention there is provided an x-ray detector suitable for use in an x-ray detection apparatus according to the first aspect of the invention and comprising a member configured to convert incident x-ray wavelength photons directly into an electronic signal and a structure for alignment with an x-ray energy spectrum source, the structure configured to perturb an x-ray energy spectrum, the said structure comprising at least three adjacent regions, each region different to immediately adjacent regions and configured to perturb the x-ray energy spectrum differently.

Advantageously, the regions lie laterally of one another, and preferably the structure comprises a plurality of regions lying laterally of one another, and preferably in two orthogonal directions.

According to a third aspect of the invention there is provided a structure configured to perturb an x-ray energy spectrum incident thereon, the structure comprising at least three adjacent regions, wherein each region is different to immediately adjacent regions, each adjacent region configured to perturb the x-ray energy spectrum differently.

Advantageously, the regions lie laterally of one another, and preferably the structure comprises a plurality of regions lying laterally of one another, and preferably in two orthogonal directions.

Advantageously, the plurality of regions is formed in an array, and the array may repeat itself in the structure. For example, the plurality of regions may comprise a three by three array of nine regions, and the structure may include a multiplicity of such arrays.

Preferably, the structure is planar or non-planar. The structure may be curved in at least one plane.

Preferably, the material difference between adjacent regions is the thickness of the material of the structure in adjacent regions.

The structure may include a plurality of protrusions or depressions, the thickness of said protrusions or depressions changing in at least one direction thereof, each protrusion or depression providing at least three adjacent regions configured to perturb the x-ray energy spectrum.

The protrusions or depressions may be pyramidal in shape.

The structure may comprise a non-metallic layer having a multiplicity of depressions formed therein, each depression filled with metal.

Advantageously, the structure comprises a first non-metallic layer having a multiplicity of depressions formed therein and a second metallic layer including a corresponding number of protrusions each protrusion filling a corresponding depression.

Preferably, the second layer covers the surface of the first layer in which the openings to the depressions are situated.

Adjacent depressions or protrusions may be separated from one another by x-ray perturbing material and wherein the material separating adjacent depressions or protrusions constitutes one of the at least three regions.

Preferably, the non-metallic layer is formed of silicon.

The depressions in the non-metallic layer are preferably formed by etching. The walls of pyramidal depressions preferably lie at 54.7 degrees to the surface of the non-metallic layer.

The material difference between adjacent regions may be the material from which the individual adjacent regions of the structure are formed.

The adjacent regions may differ in thickness and in the material from which they are made. For example, the structure may comprise a substrate of even thickness, and the individual regions may be formed on a surface thereof by building up discrete layers of material on adjacent regions. The number of layers and/or the materials of those layers may differ. Techniques such as PVD, electro-deposition, laser ablation or 3d-printing may be used to form the individual regions.

In addition, the regional variation may be created by stacking layers of foils with cut-out regions one on top of each other so that the cut out regions stack in such a way to create a variety of thicknesses in a lateral sense.

Another alternative would be to stack a series of wire meshes together in a similar fashion to the foils such that variations in material thicknesses are formed. Preferably, the individual wires of each wire mesh are rectangular in cross-section. This is similar to techniques used to form neutral density filters.

Another alternative is to start with a certain thickness of material and cut out regions to create differing thicknesses. This could be done by laser micro-machining or ion-beam milling amongst the many techniques.

It should be noted that the purpose of the structure is to perturb the x-ray/gamma ray energy spectrum, so that at least a proportion of the x-ray/gamma ray energy spectrum incident at each region of the structure is transmitted to the detector.

According to a fourth aspect of the invention there is provided method of determining a material property of a substance comprising the steps of:
a) positioning the substance in an x-ray detection apparatus according to the first aspect of the invention;
b) causing the x-ray source to direct an x-ray energy spectrum along the common axis;
c) analysing electronic signals emitted by the member configured to convert incident x-ray wavelength photons into electronic signals.

BRIEF DESCRIPTION OF THE DRAWINGS

In the Drawings, which illustrate prior art devices, preferred embodiments of an x-ray detection apparatus according to the invention, and components thereof:

FIG. 1a is schematic representation illustrating x-ray imaging of an object having three regions of interest;

FIG. 1b is a graph illustrating the counts for the three regions of interest in the object detected using the detector illustrated in FIG. 1;

FIG. 2a is a schematic representation illustrating x-ray imaging of the same object shown in FIG. 1, using a detector according to an embodiment of the invention;

FIG. 2b is a graph illustrating the counts for the three regions of interest in the object detected using the detector illustrated in FIG. 2;

FIG. 3 is a schematic representation illustrating x-ray imaging of an object using a detector according to another embodiment of the invention;

FIG. 4 shows graphs representing the change in counts and spectral shape for an x-ray beam detected using a detector of the type shown in FIG. 2a;

FIG. 6b illustrates an alternative type of detector for generating absorption edges;

FIG. 6c is an alternative type of detector for generating absorption edges;

FIG. 6d' illustrates a collimator component of the detector illustrated in FIG. 6d;

FIG. 7 shows graphs representing the change in counts and spectral shape for an x-ray beam detected using a detector of the type shown in FIG. 6a;

FIG. 12a is an exploded view of an interference plate built up from a number of layers of material;

FIG. 12b is a plan view of component parts of an interference plate of the type illustrated in FIG. 12a;

FIG. 15b illustrates exploded side and schematic views of the embodiment illustrated in FIG. 15a;

DETAILED DESCRIPTION OF THE PREFERRED EMBODIMENTS

Figure 8:
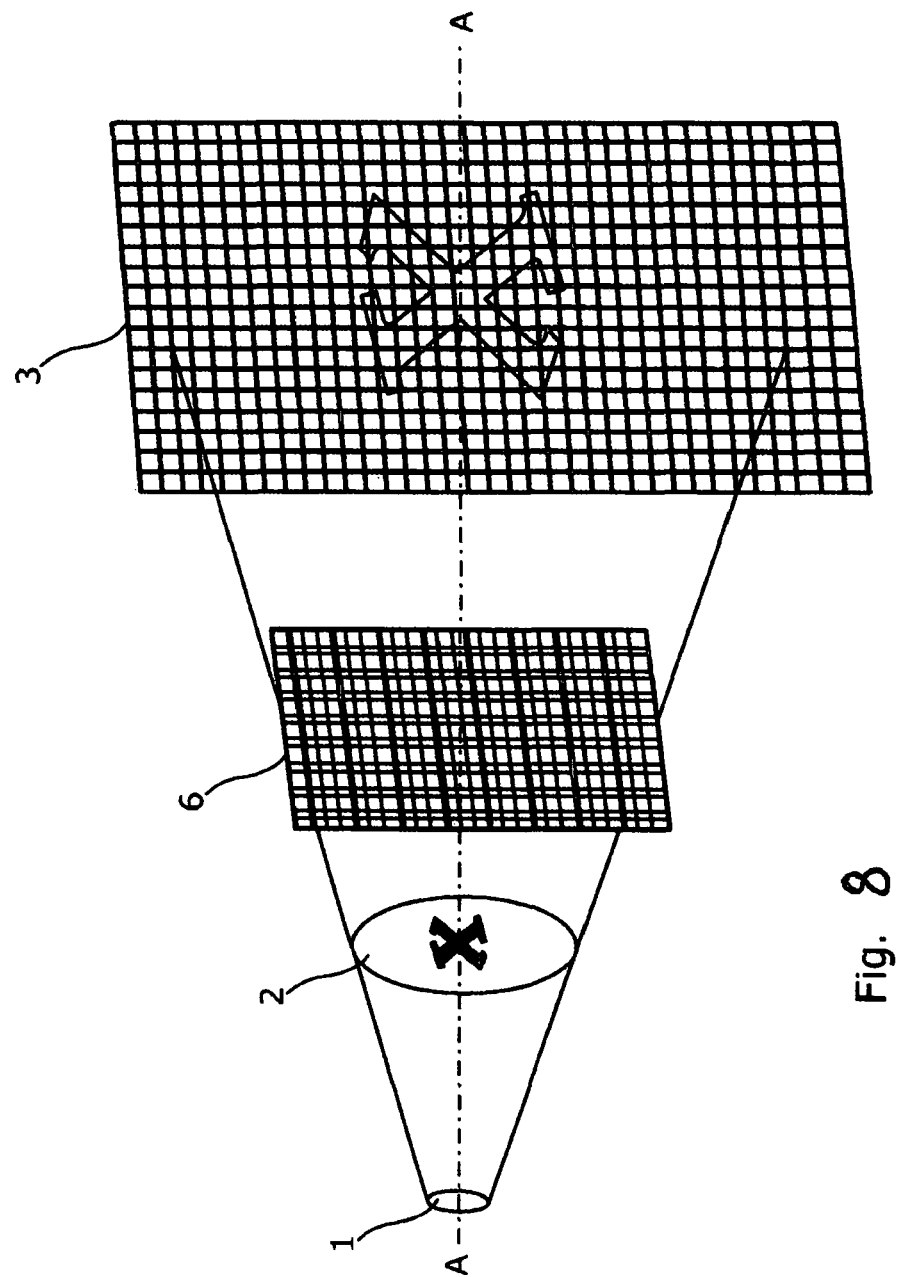
FIG. 8 is a simplified schematic representation of an x-ray detector according to a first embodiment of the invention.
Figure 9:
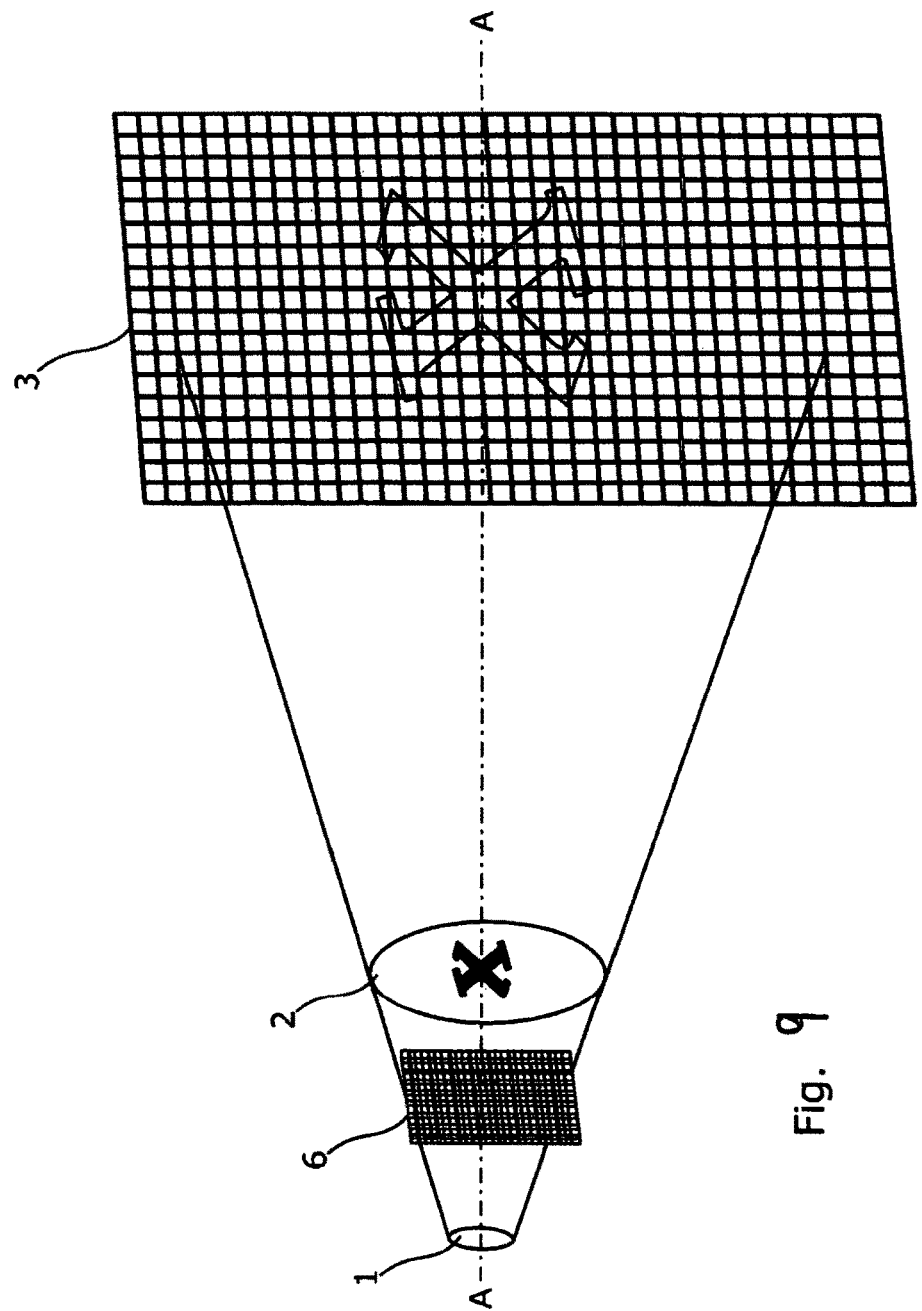
FIG. 9 is a simplified schematic representation of an x-ray detector according to a second embodiment of the invention.

Referring now to FIGS. 8 and 9, for the sake of clarity, the detector is shown in its most basic form and comprises an x-ray source 1, an object 2, a pixelated detector 3 and a structure 6. X-rays emitted from the x-ray source 1 pass through the object 2, the attenuated x-rays that have passed through the object 2 being detected by the detector 3, which converts incident x-rays directly into electronic signals. The x-ray source 1, object 2, pixelated detector 3 and structure 6 lie on a common axis A-A. The structure 6 may be a multi-absorption plate, a collimator or a combination of the two. The difference between FIGS. 8 and 9 lies in the position of the structure 6.

The detector 3 may be Silicon diode detectors, Lithium drifted silicon detectors, High Purity Germaium detectors HPGe, Cd based detectors—CdTe, CdZnTe, CdMnTe and others, proportional counters, or Gas filled detectors.

Referring now to FIGS. 1a and 1b, an object 2 having three regions of interest, ROI1, ROI2 and ROI3 is positioned between an x-ray source 1 and an array detector 3. The material of each region of interest has a different density. The purpose of FIGS. 1a and 1b is to illustrate the dynamic range limitations of detectors of the prior art when imaging such materials using a single x-ray beam source 1.

FIG. 1b illustrates the signal related to each region of interest. ROI1 has the highest density and absorbs the most x-ray energy. In order for the detector 3 to be able to detect a signal, the x-ray flux from the source must be kept sufficiently high that the x-ray energy passing through ROI1 is distinguishable from the background noise. The problem that results is that where the material is least dense, in ROI3 so little x-ray energy is absorbed that the x-rays passing through ROI3 result in a count rate at the detector that exceeds the detector's maximum count rate. This causes pulse pile up and spectral distortion. The combination of materials ROI1, ROI2 and ROI3 is beyond the dynamic range of the detector 3.

FIG. 2a illustrates an apparatus of the invention, which includes a multi-absorption plate 4. In the illustrated embodiment the multi absorption plate is mounted between the detector 3 and the object 2. However, the multi-absorption plate (MAP) 4 may be mounted between the x-ray source 1 and the object 2.

The multi-absorption plate 4 illustrated in FIG. 2a includes a repeating pattern of elements 4a, 4b and 4c. In the illustrated example, the element 4a is an open aperture and hence does not absorb x-rays. The element 4b is comprised of a material which absorbs x-rays and is of a first thickness. The element 4c is comprised of the same material as 4b but twice the thickness. The element 4c could be a material or a combination of materials that absorb x-rays more readily than the material of element 4b.

The source 1, object 2 and its regions of interest ROI1 to ROI3, and the detector 3 are identical to the embodiment of FIG. 1a. The difference between the two apparatus is the multi-absorption plate 4. The elements 4a to 4c of the MAP 4 cause three separate x-ray signals to be detected by the detector 3 for each region of interest. This is illustrated in FIG. 2b, which shows three signals related to each region of interest ROI1 to ROI3. For each region of interest all those x-rays passing through an element 4a are unaffected by the MAP and therefore the counts detected by the pixels of the detector aligned with elements 4a are the same as for the apparatus shown in FIGS. 1a and 1b.

Looking at ROI1, for pixels of the detector 3 aligned with elements 4b, the x-ray count at the detector is lower. However, the count is still above the noise floor of the detector, i.e. within the detector's dynamic range. The element 4c of the MAP absorbs x-rays more readily than the element 4b resulting in fewer x-rays being counted by the pixels of the detector 3 aligned with elements 4c. The x-rays are absorbed by elements 4c to such an extent that the x-rays counted by the detector 3 are below the noise floor, i.e. outwith the dynamic range of the detector.

Looking at ROI3, the least dense region of interest, for pixels of the detector 3 aligned with elements 4b, the x-ray count at the detector is lower. They are now below the maximum count rate of the detector 3 and hence within the detector's dynamic range. The element 4c of the MAP absorbs x-rays more readily than the element 4b resulting in fewer x-rays being counted by the pixels of the detector 3 aligned with elements 4c. The x-rays are absorbed by elements 4c more than elements 4b, so the count rate at the pixels of the detector 3 aligned with elements 4c is lower than for those aligned with elements 4b.

As can be seen from FIG. 2b, for ROI2, the counts lie within the dynamic range of the detector for all the pixels of the detector 3, irrespective of which elements 4a to 4c they are aligned.

One skilled in the art will appreciate that by introducing a multi-absorption plate, whilst one third of the signal associated with ROI1 has shifted out of the detector's dynamic range, i.e. below the noise floor, two thirds of the signal associated with ROI3 has been brought within the detector's dynamic range, whereas without the MAP the signal associated with ROI3 is outwith the detector's dynamic range.

Those pixels where the counts lie outside the detector's dynamic range are unusable. Hence, the MAP leads to a slight reduction in image resolution. However, the whole sample can be imaged in a single acquisition, whereas in the apparatus of FIG. 1a, two acquisitions with the source at different flux settings would be required to obtain images for each region of interest falling within the dynamic range of the detector 3.

Figure 4:
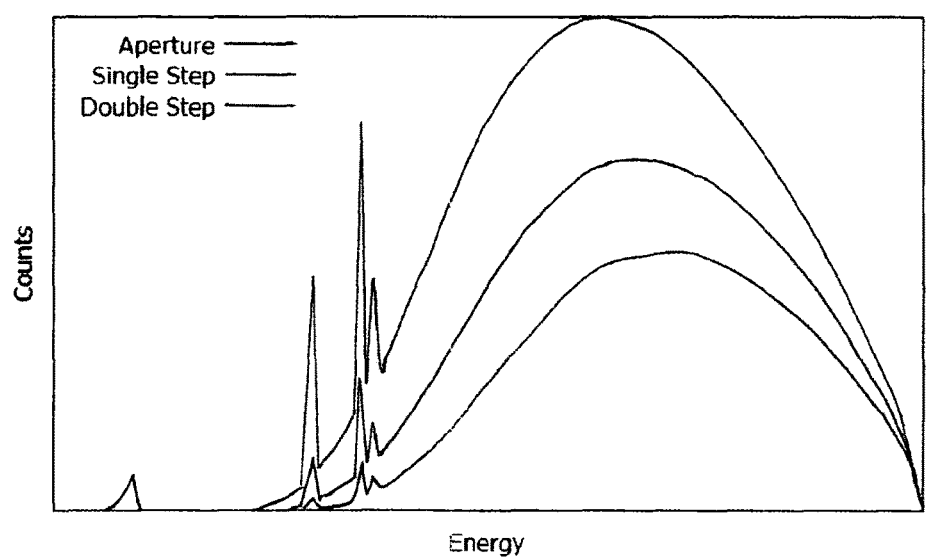
Figure 5:
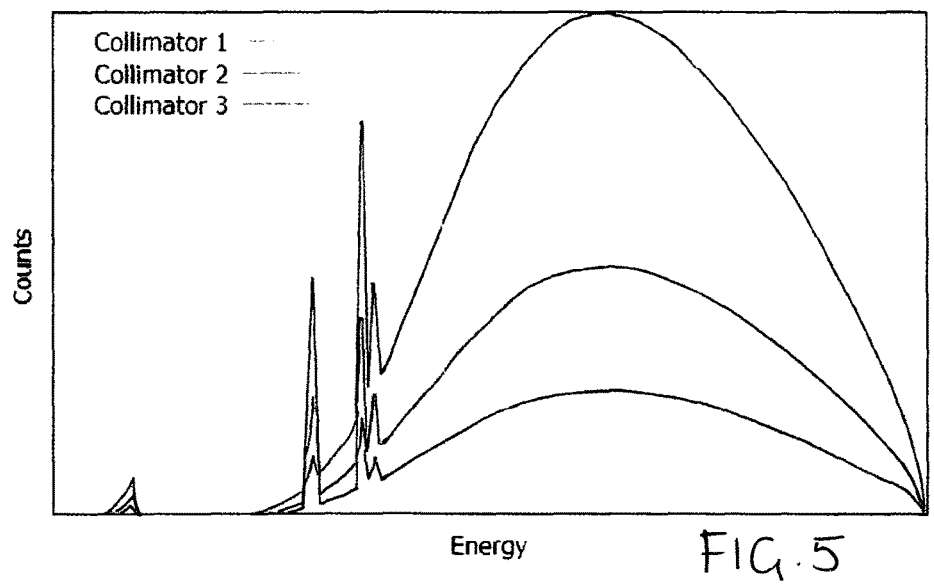
FIG. 5 shows graphs representing the change in counts and spectral shape for an x-ray beam detected using a detector of the type shown in FIG. 3.

FIG. 4 illustrates the change in counts and spectral shape for the multi-absorption plate 4. The elements 4a are apertures, the elements 4b and 4c being 1 mm and 2 mm thick copper respectively. The object in FIG. 4 was a 1 mm thick sheet of tin.

FIG. 3 illustrates an alternative configuration where the multi-absorption plate 4 is replaced by a collimator 14. Instead of the elements 4a to 4c presenting different thicknesses of material as in the FIG. 2a embodiment, each element 14a to 14c of the collimator 14 is an aperture of different size. Each element 14a to 14c reduces the x-ray flux by a different amount. However, the energy distribution of the x-ray beam emanating from the source 1 is maintained, but the count rate is reduced more by the progressively smaller apertures of elements 14a to 14c.

Figure 6A:
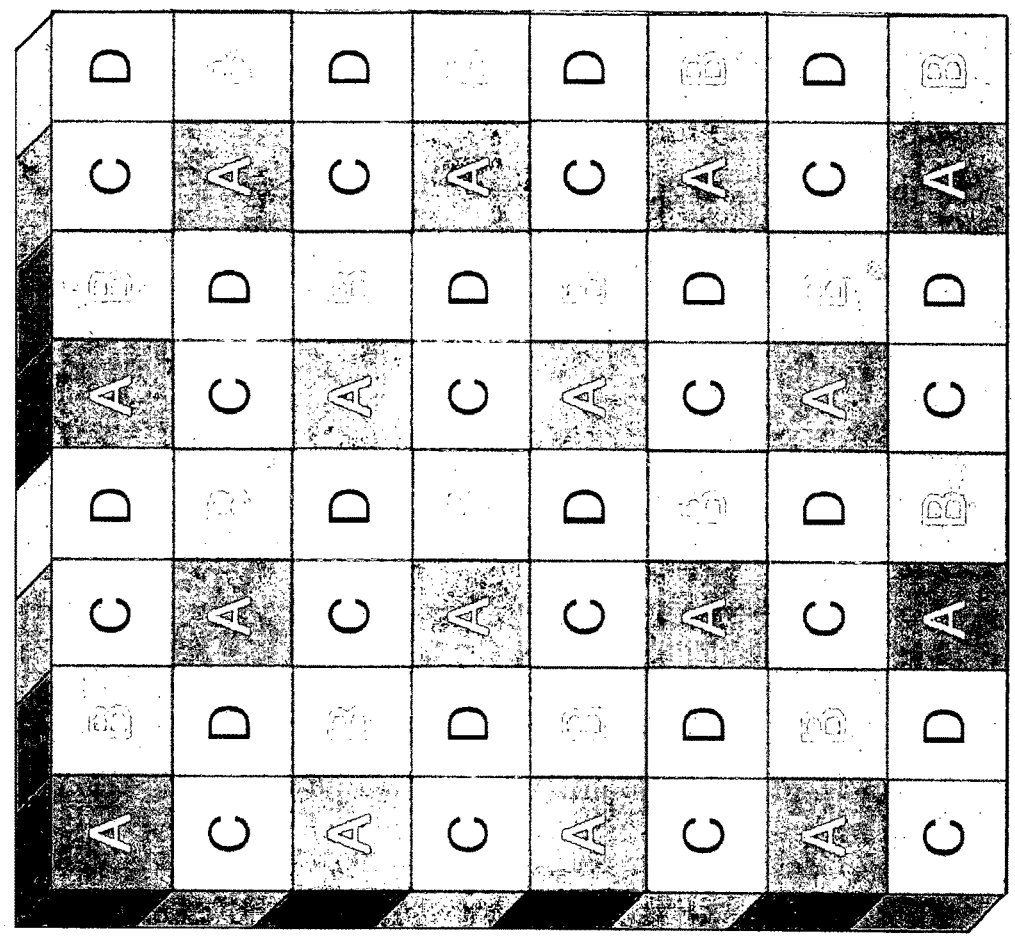
FIG. 6a is a schematic representation illustrating x-ray imaging of an object using a detector according to another embodiment of the invention, the detector generating absorption edges.

Referring now to FIGS. 6a and 6b, the apparatus illustrated in each figure is adapted to produce absorption edges.

FIG. 6a illustrates a multi-absorption plate 20 similar to that shown in FIG. 2a, the difference being that whereas in FIG. 2a one of the elements 4a is an aperture, in FIG. 6a each element is comprised of a material through which the x-ray beam must pass. The MAP 20 comprises a repeating structure of four elements A to D each being materially different to the other. In such an arrangement, not only are the elements immediately adjacent one another different, but also those diagonally adjacent one another are different from one another.

The material of each element A to D is selected to produce a different absorption edge. This may be achieved by each element A to D being comprised of a different material, by each element A to D being comprised of the same material but having a different thickness, or each element being comprised of a different material and each element having a different thickness. For example, element A may be comprised of gold, element B indium, element C lead and element D tin.

FIG. 6b illustrates a different arrangement comprising a collimator 14 of the type shown in FIG. 3. In order to produce absorption edges a MAP 20 is placed between the object 2 and the collimator 14. Advantageously, the MAP 20 has a repeating pattern of elements A-D individual elements of which are aligned with individual collimators 14a, 14b, 14c.

FIG. 6c illustrates an arrangement comprising a source 1, an object of interest 2, a detector 3, a collimator 14 and a MAP 20'. The MAP 20' is a three by three array of regions A, B, C each having a different absorption edge and emitting a different fluorescence peak. The collimator in this figure is a three by three array of repeating regions of three by three collimators 14a to 14c. As can be seen in the figure, the first row of plate 30 the sequence of regions is A, B, C. In the row below it is B, C, A and in the row below that C, A, B.

Hence, the region A of MAP 20' overlies the nine collimators, the three collimators 14a to 14c shown in the Figure, the six collimators of the two rows below making up the 3×3 array of collimators. Region B of the MAP 20' overlies the next 3×3 array of collimators and Region C the next 3×3 array of collimators.

Each region A, B, C of the MAP 20' has a different absorption edge and induces a different fluorescence peak.

Figure 6D:
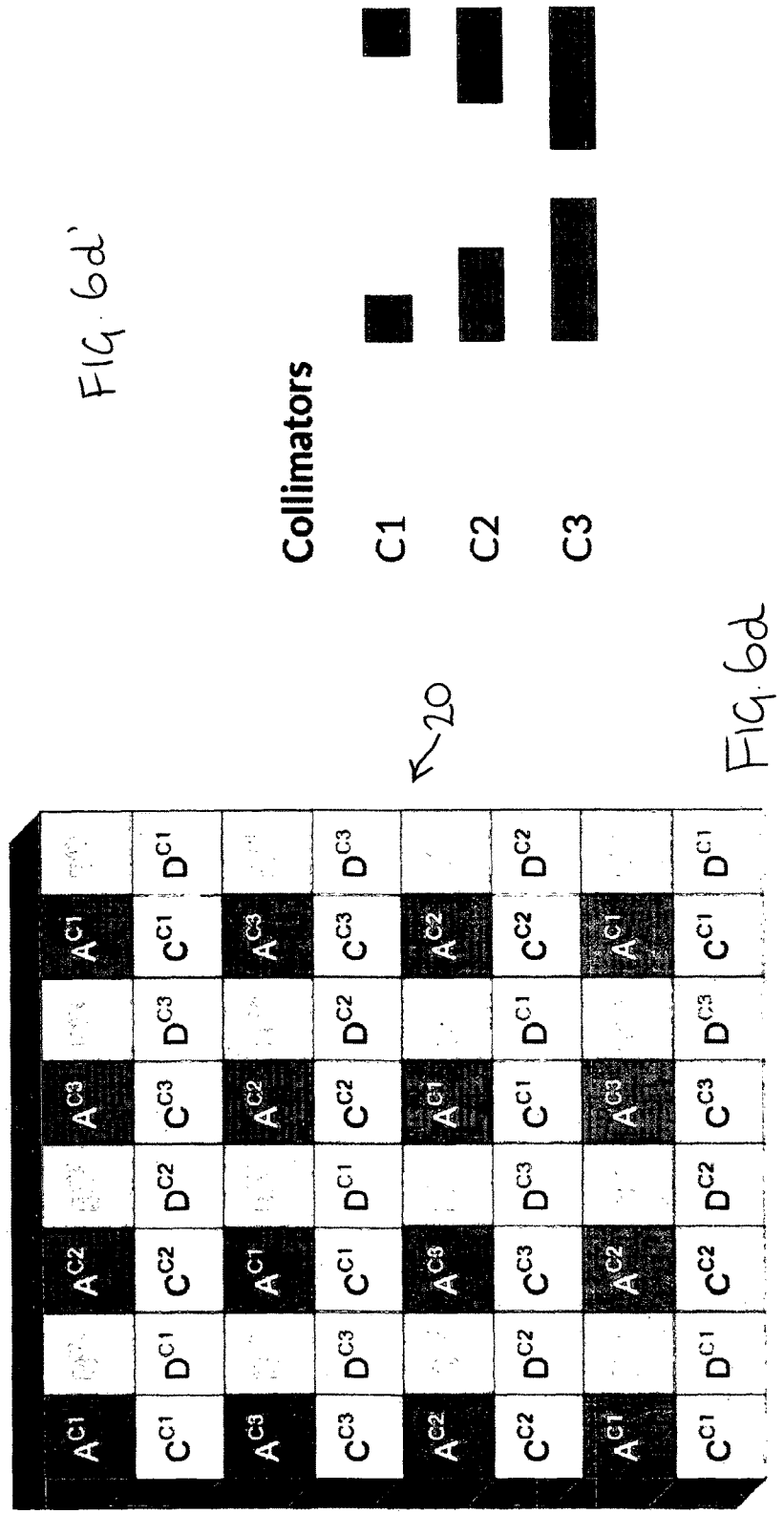
FIG. 6d illustrates another alternative type of detector for generating absorption edges.

FIG. 6d illustrates an arrangement similar to that shown in FIG. 6c insofar as the arrangement comprises an x-ray source, a collimator 14, a MAP 20 and a detector 3. However, the configuration of the MAP 20 and the collimator 14 are different. The MAP 20 comprises four different types of material A to D, each having a different absorption edge and in which the individual regions of those materials is smaller than in the arrangement illustrated in FIG. 6c.

The collimator 14' of FIG. 6d comprises 4×4 array of a repeating pattern of groups of three collimators C1, C2 and C3. For any one group of collimators, each collimator is aligned with a different material of the MAP 20. This means that every count rate has each adsorption edge and fluorescence peak associated with it across a multitude of regions.

Figure 7:
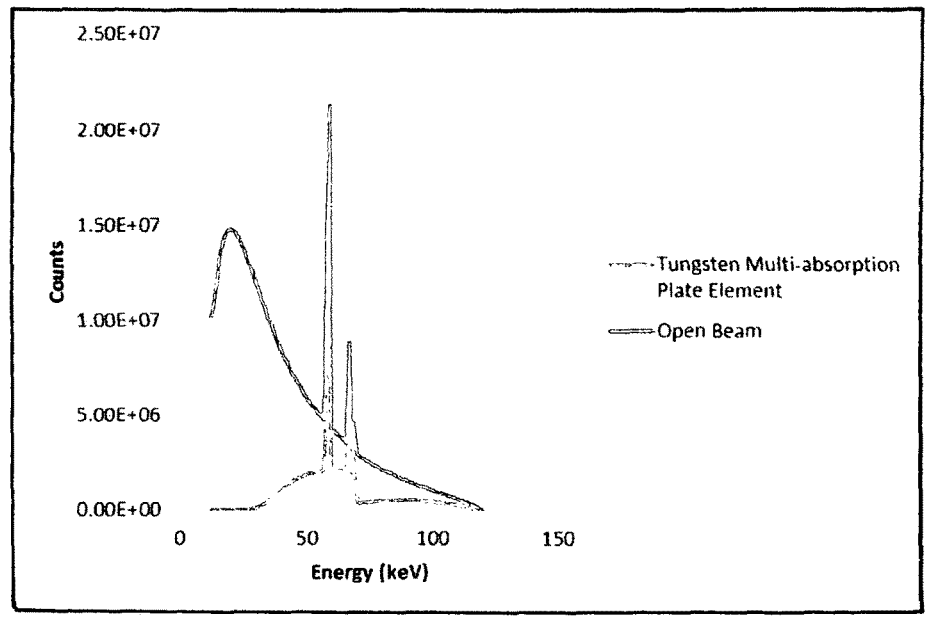

FIG. 7 compares the x-ray spectrum recorded at the detector where the path between the x-ray source and the detector is open (the upper trace) and where a material having an absorption edge is placed between the x-ray source and the detector (the lower trace). It will be appreciated that each different region of the MAP 20 induces a different absorption edge and in this way a pattern of absorption edges and fluorescence peaks may be imposed on the x-ray spectrum incident on the plate. Hence, the x-ray spectrum incident on the detector is a multiplicity of different fluorescence peaks, each peak corresponding to an element of the MAP 20 on which the source x-ray spectrum was incident.

The elements of the MAP must be of a suitable material in order to produce fluorescence peaks. Suitable materials include, but are not limited to: tungsten, gold, lead, tin and indium, which all have absorption edges and fluorescence peaks within the energy range of typical measurements of 30 to 80 keV. The energy of each of the multiplicity of spectra is of a suitable energy range to be useful for medical imaging, industrial imaging and the analysis of thin films and the like since the secondary x-rays of the fluorescence peaks are easily suitably interacting.

The combination of the collimator 14 with the MAP having elements whose absorption edges are at wavelengths within the x-ray source emission spectrum is useful where the dynamic range of the detector 3 is likely to be exceeded.

In each of the drawings the MAP 20 and collimator 14 are shown positioned between the object of interest and the detector. However, other configurations of the x-ray source, sample, MAP, collimator and detector are possible. For example the arrangement may be any of those listed below:
Source/sample/MAP/detector;
Source/MAP/sample/detector;
Source/sample/collimator/detector;
Source/collimator/sample/detector;
Source/sample/collimator/MAP/detector;
Source/sample/MAP/collimator/detector;
Source/collimator/MAP/sample/detector;
Source/MAP/collimator/sample/detector.

The MAP may be manufactured in a multitude of different ways. The regions of the MAP may be:
a) Different materials of different thickness;
b) Different materials of the same thickness;
c) The same material of different thickness.

Where the MAP is to produce absorption edges and fluorescence peaks variants a and b are preferred. Variant c could be configured primarily to modify the spectral shape by hardening of the X-ray beam through attenuation. An absorption edge common to the whole MAP nevertheless be useful, for example to assist in calibration of the apparatus.

FIGS. 10 to 15b illustrate different configurations of multi-absorption plate.

Figure 10:
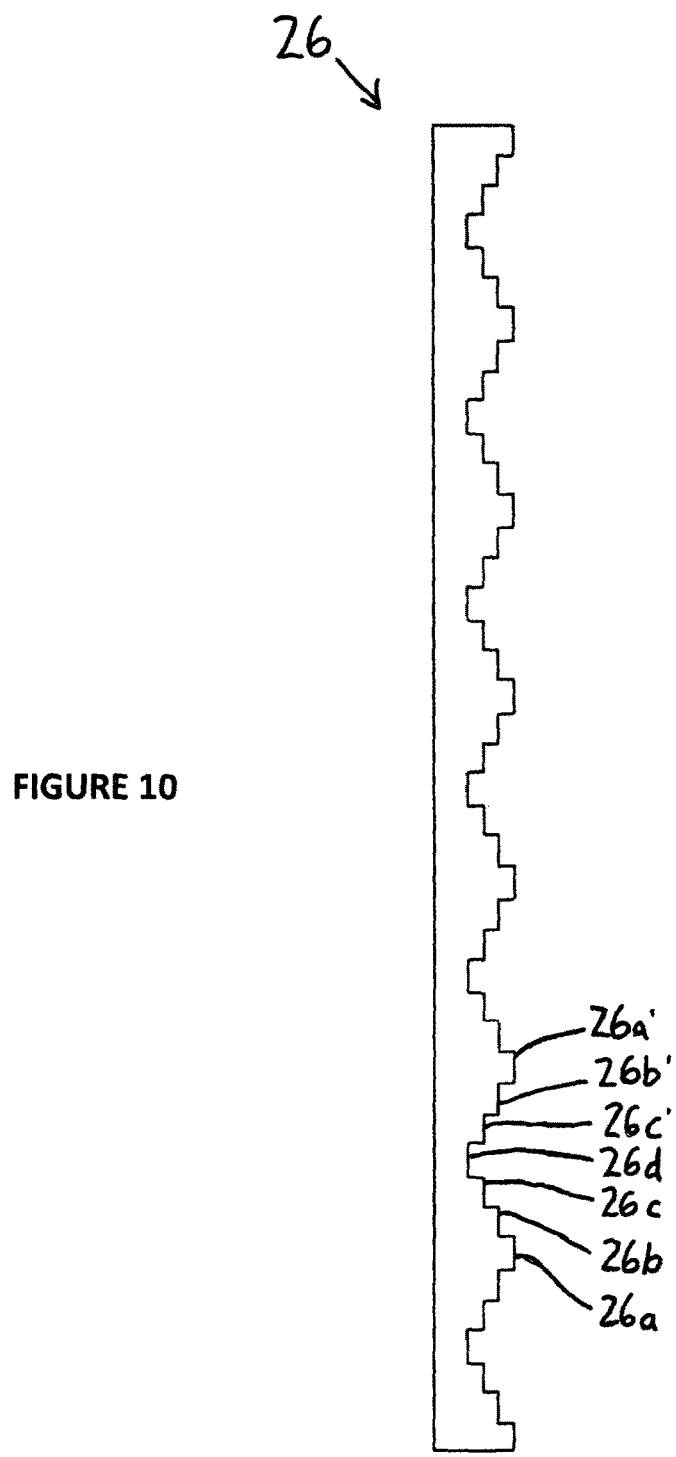
FIG. 10 is a cross-sectional view of an interference plate of a detector.
Figure 11:
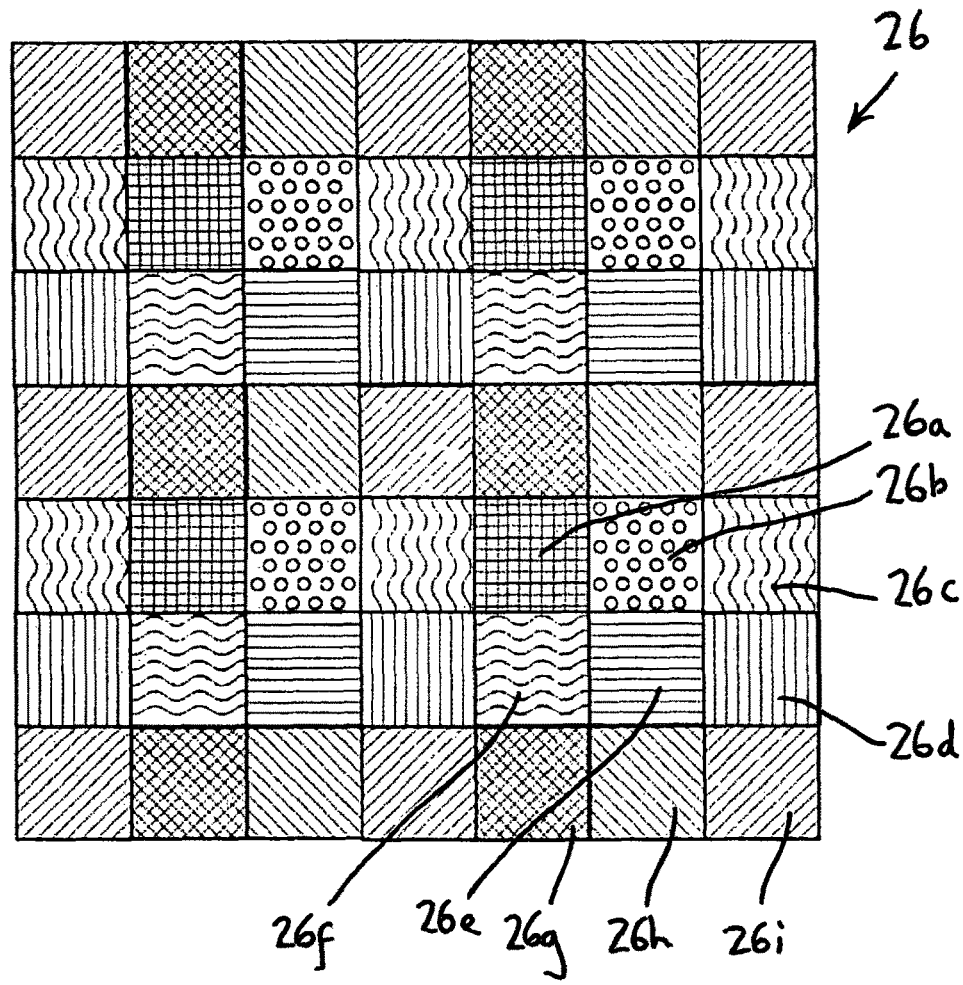
FIG. 11 is a front view of the multi-regioned structure, i.e. an interference plate illustrated in FIG. 10.

FIGS. 10 and 11 illustrate an interference plate 26 (which may also be considered to be a multi-absorption plate, i.e. different regions of the plate have different x-ray absorption capabilities), of tungsten for example. Further, in addition to manufacturing the interference plate such that regions thereof have different thicknesses, it possible that the interference plate may have uniform thickness, with the material difference between adjacent regions being provided by forming the individual regions of the interference plate of different materials.

The interference plate may comprise a substrate with the individual regions formed on or in the substrate. The individual regions may be formed in the base layer by etching or even machining the substrate.

The interference plate may be formed by 3d-printing.

The individual regions 26a-26d shown in FIGS. 10 and 11 may represent regions of different thickness or materials or combinations thereof.

The individual regions may be formed on the substrate by deposition, for example by a technique well known in the art as "lift-off". An advantage of such a technique is that the material deposited in the "lift-off" process may be the same as the material from which the substrate is formed. The material difference between adjacent regions is the thickness of each pixel. Further, the deposited material may be different to the substrate material, providing for the material difference between adjacent regions to be in material type and/or the material thickness.

Further, in addition to manufacturing the interference plate such that regions thereof have different thicknesses, it possible that the interference plate may have uniform thickness, with the material difference between adjacent regions being provided by forming the individual regions of the interference plate of different materials.

The interference plate may comprise a substrate with the individual regions formed on or in the substrate. The individual regions may be formed in the base layer by etching or even machining the substrate.

The interference plate may be formed by 3d-printing.

The individual regions may be formed on the substrate by deposition, for example by a technique well known in the art as "lift-off". An advantage of such a technique is that the material deposited in the "lift-off" process may be the same as the material from which the substrate is formed. The material difference between adjacent regions is the thickness of each pixel. Further, the deposited material may be different to the substrate material, providing for the material difference between adjacent regions to be in material type and/or the material thickness.

Figure 12B:
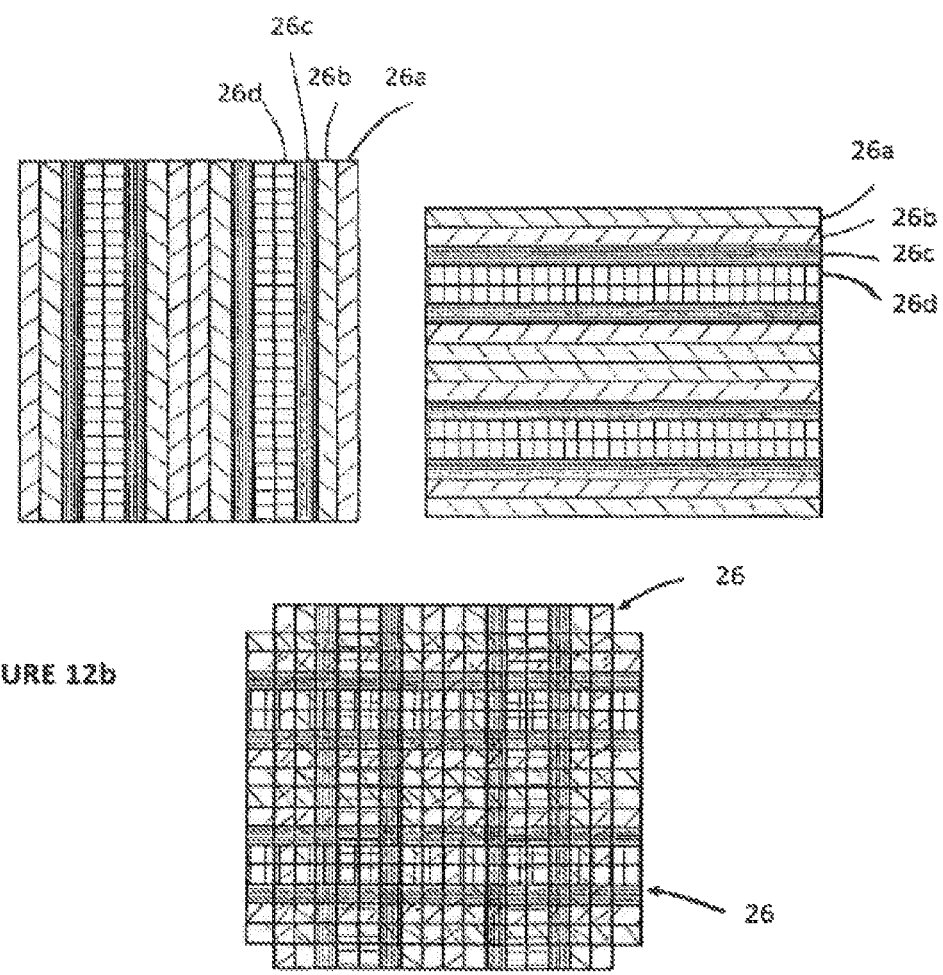

FIGS. 12a and 12b illustrate an alternative construction of interference plate 26. In this example the interference plate 26 is formed of four layers of material 26a to 26d, such as foil. The first layer is not perforated. The second layer 26b includes apertures 26b' of a first width. The third layer 26c includes apertures 26c' of a second width, and the fourth layer 26d includes apertures 26d' of a third width. When stacked with the centres of the apertures 26b' to 26d' aligned the resulting structure has a cross-section 26'. When the layers 26a to 26d are stacked with the edges of the apertures aligned the resulting structure has a cross-section 26".

The structures 26', 26" each provide elongate regions of differing thickness.

In FIG. 12b, two of the resulting interference plates 26 are stacked with the apertures aligned perpendicular to one another. The resulting interference plate provides an array of square regions, wherein adjacent regions are of differing thickness.

Figure 13:
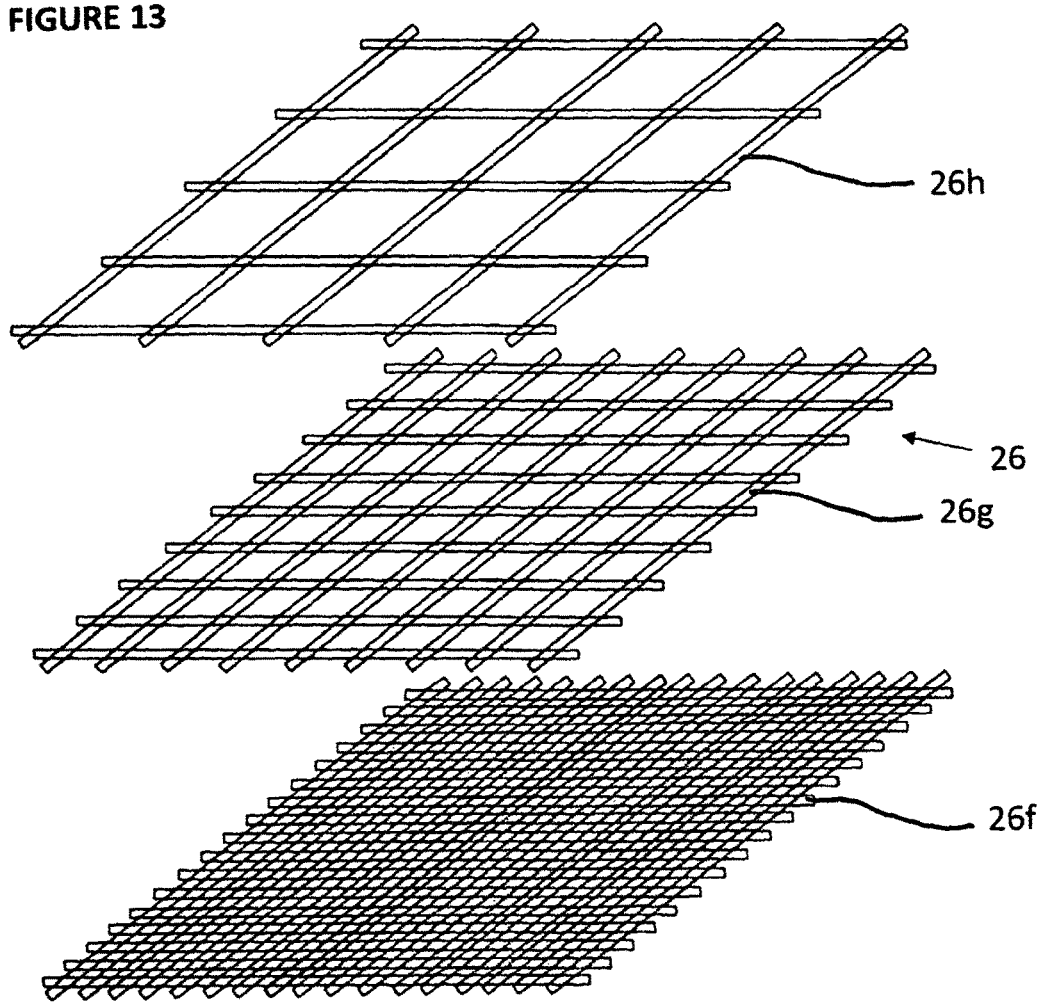
FIG. 13 is an exploded view of an interference plate built up from a number of layers of wire mesh.

FIG. 13 illustrates another alternative arrangement of interference plate 26 comprising three layers 26f to 26h of wire mesh, each of differing mesh size. When stacked one on top of the other, in some regions incident x-rays will impinge upon the wires of the first layer 26f, in other regions incident x-rays will impinge upon wires of the second layer 26g, and in other regions incident x-rays will impinge upon wires of the third layer 26h. Further, in other regions incident x-rays will impinge upon a combination of some of the wires of more than one of the layers 26f, 26g and 26h. Further, there will be regions where no wire is present and hence x-rays incident on these regions will pass through unperturbed. Preferably, the wires are rectangular in cross-section.

Figure 14:
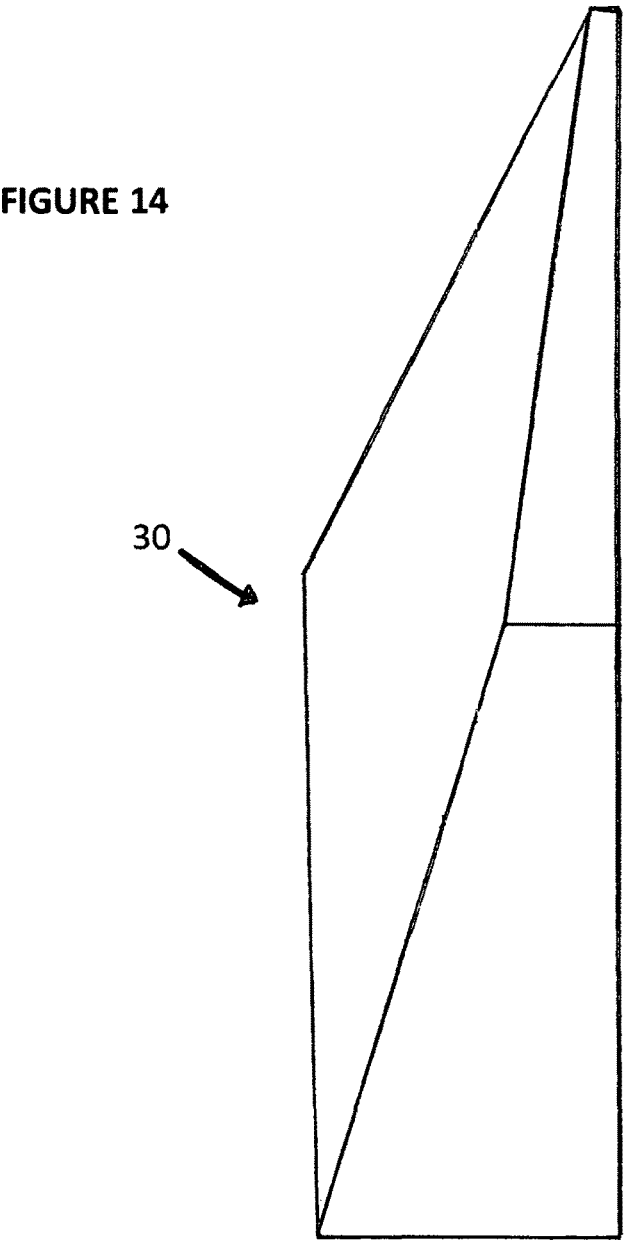
FIG. 14 is a schematic representation of a region of an interference plate the region having a thickness which varies in two directions of the plate.

In FIG. 14 the interference plate 30 comprises a block of material that represents a region of a multi-absorption plate and which varies in thickness along two axes across the plate. Hence, the thickness of the material changes continuously across the plate.

Figure 15A:
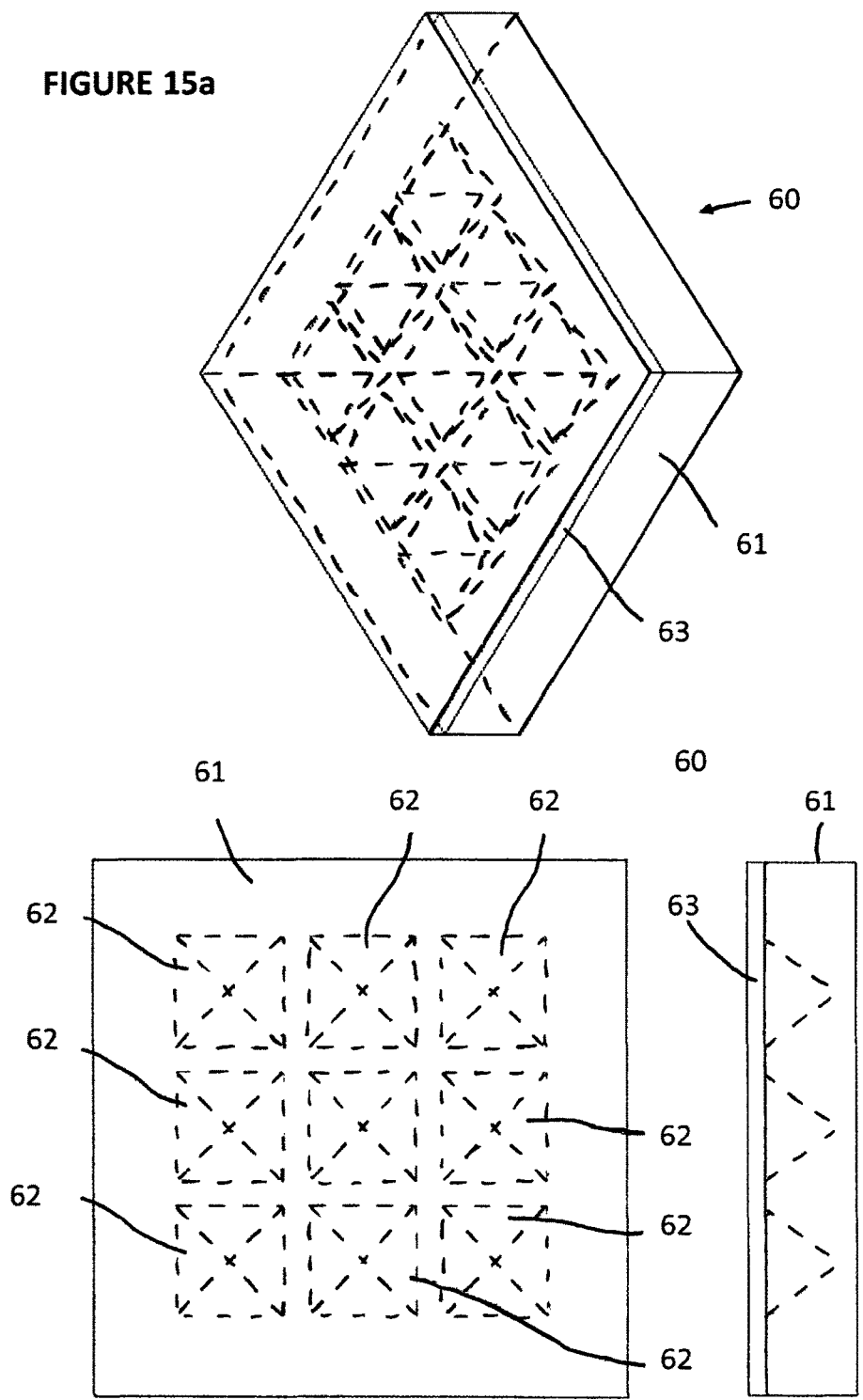
FIG. 15a is schematic, top plan and side views of an alternative embodiment of an interference plate.

Referring now to FIGS. 15a and 15b, there is shown a further alternative construction of interference plate 60 comprising a first layer 61 and a second layer 63. The first layer 61 is formed of a silicon wafer and having formed therein a multiplicity of depressions 62. In the illustrated example the depressions have a depth of 800 micron. The depressions are formed by etching. It is known that strong alkaline wet etchants such as potassium hydroxide or tetra methyl ammonium hydroxide will preferentially etch certain crystal planes of silicon compared to others due to a difference in the bond strength of silicon atoms in the different crystal planes. The {111} crystal planes are amongst the most resistant to the etchants and so the {100} and {110} planes will be etched at far greater rates than the {111} planes. The silicon wafer from which the first layer 61 is formed is a {100} oriented. A mask defining the array of depressions 62 is applied to a surface of the silicon wafer and an alkaline etchant applied. Where the alkaline etchant is in contact with the silicon it begins to etch down forming square based pyramidal shaped depressions 62. The sloping side-walls of the depressions 62 are the {111} planes of silicon and thus are angled at 54.7 degrees compared to the surface of the {100} silicon wafer. The etching process is allowed to proceed until the {111} side walls converge to form the apex of a pyramid shaped depression 62.

The etchant used to create the depressions 62 was potassium hydroxide. The mask used to form the depressions 62 corresponds in shape to the plan view shown in FIG. 12a. In the illustrated example, the depressions are set out on a 1 mm×1 mm centre to centre grid. The distance between adjacent depressions 62 is approximately 50 microns.

The number of depressions may be increased or decreased by increasing or decreasing the distance between the centres of the depressions. When the distance between depressions is changed the depth of the depression and hence the size of the base of the depression will change, the size of the base being a function of the depth of the depression and the wall angle of 54.7 degrees. For example, the depth of each depression may be reduced to 100 micron.

FIGS. 15a and 15b illustrate a part of an interference plate. The interference plate might measure 26 cm×15 cm for example, and the depressions may be on a grid that is smaller than the 1 mm×1 mm centre to centre grid illustrated here.

The second layer 63 is formed of metal such as nickel, copper or tin. It is this metal second layer 63 which perturbs the x-rays incident upon it, each pyramidal protrusion providing a substantially infinite number of regions of different thickness as the thickness of the metal changes along the slope of the walls of the pyramid. The first layer serves to assist in manufacture of the interference plate and post manufacture to support and protect the metal layer 63. As can be seen from FIGS. 16a and 16b, the second layer 63 includes pyramidal shaped protrusions 64 and a backing plate 65. The second layer 63 is formed by deposition molten metal on to the surface of the first layer 61, the molten metal filling the pyramidal depressions 62 and forming a thin backing plate 65 (in the order of a few microns) covering the surface of the first layer 61. The metal of the second layer 63 between adjacent pyramidal protrusions may be considered as a region of different thickness to an adjacent region, perturbing the x-ray energy spectrum differently to the metal of the adjacent pyramidal protrusions.

Interference plates (also referred to as a multi-absorption plate) may be formed using three-dimensional printing techniques.

Figure 17:
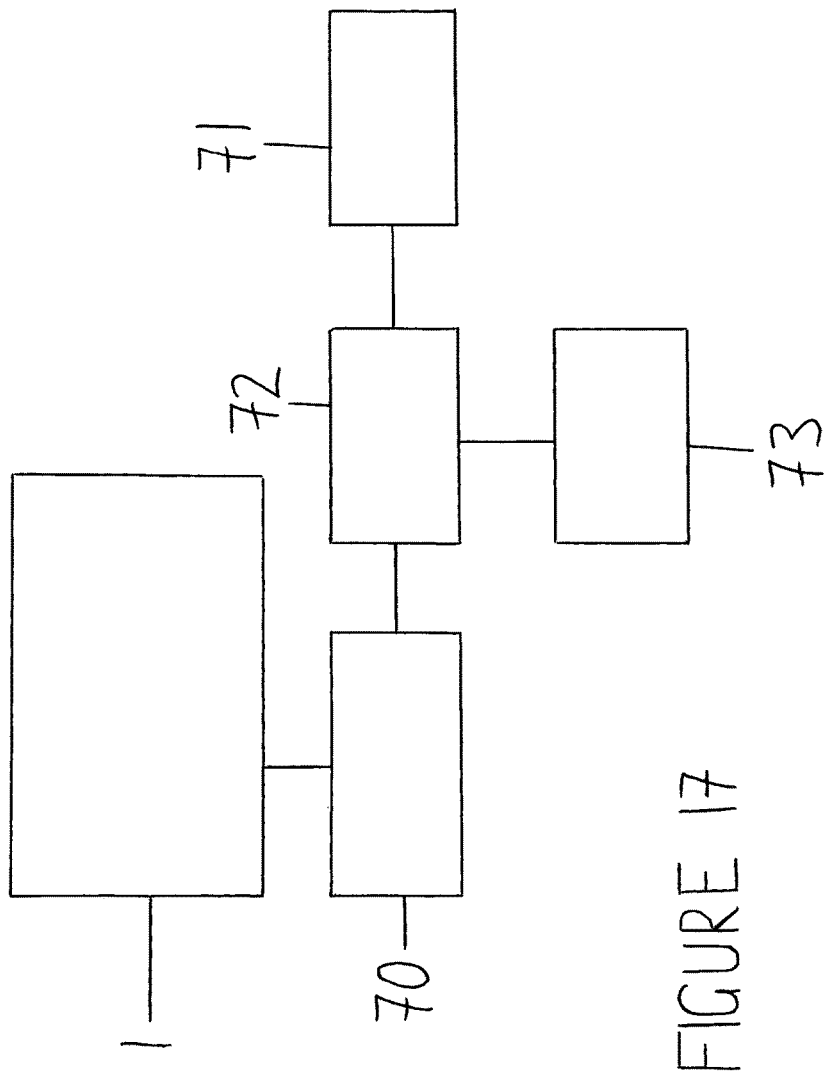
FIG. 17 is a block diagram illustrating an embodiment of the invention.

FIG. 17 is a block diagram of a system according to an embodiment of the invention in which the detector 1 (which may be the detector of any of the previously described embodiments or other embodiments falling within the scope of the claims) provides an output to a data recording means 70. The data recording means is in communication with a data processor as is a database 71 in which data characteristic of known materials are recorded. The data recording means 70 and the database 71 are in communication with a data processor 72 which runs data processing software, the data processing software comparing information from the data recording means and the database to determine a material property of an object 3. A data output interface 73, such as but not limited to a VDU, is preferably included to which a determination of the data processing software may be outputted.

In another embodiment of the system illustrated in FIG. 13, the detector 1 may output directly to the data processor 72, in which case the data recording means may be omitted, or the data recording means 70 may record data from the detector 1 via the data processor.

Figure 16:
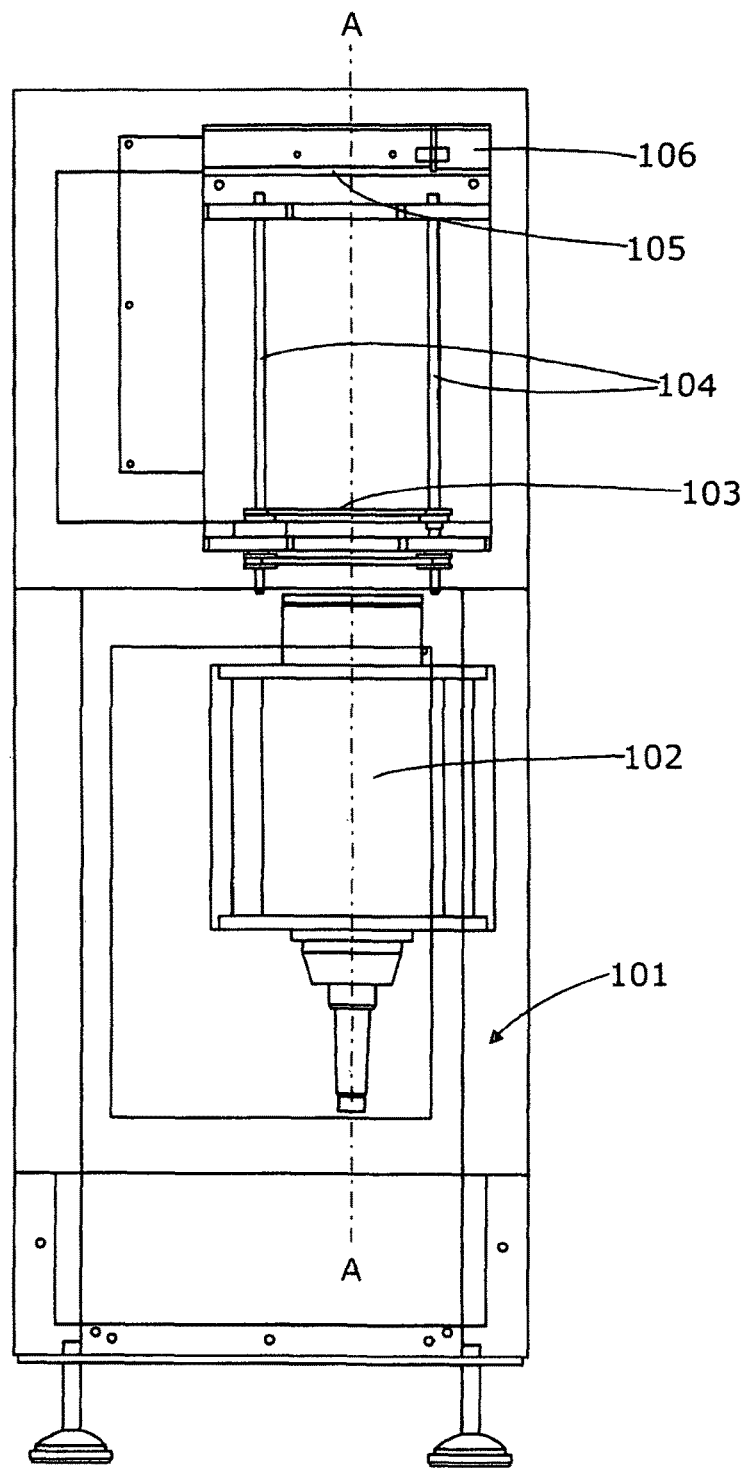
FIG. 16 illustrates an apparatus according to the invention.

Referring now to FIG. 16, there is shown a laboratory scale apparatus 100 according to the invention. The apparatus includes a cabinet 101 in which is mounted an x-ray source 102, a position for a material under test in the form of a sample stage 103 which is mounted on rails 104 so that the position of the stage may be adjusted. The apparatus 100 further includes an interference, or multi-absorption, plate 105 and an x-ray detector 106. The detector 106 forms part of an x-ray camera which includes a scintillator for converting the x-ray wavelength photons of the x-ray shadow image into visible wavelength photons. The camera captures an image which may then be analysed. The detector 106 may be the detector 1 of the embodiment illustrated in FIG. 17, and the elements 70 to 73 may form part of the apparatus 100 or may be embodied in components in communication with the apparatus 100.

To determine a material property of a substance the substance is positioned on the sample stage 103 and the x-ray source 102 is caused to direct an x-ray energy spectrum through the so positioned sample, the plate 105 to impinge upon the detector 106. The x-ray spectrum is analysed according to the following steps:

Step (i)—The detector 106 is pixelated: the intensity and energy of X-rays recorded by the detector for each pixel is compared with the recorded intensity and energy for its adjacent pixels and the differences are recorded;

Step (ii)—The intensity and energy of X-rays recorded by the detector for each pixel is compared with the recorded intensity and energy for its adjacent pixels and the differences in intensity are recorded without a substance present in the apparatus;

Step (iv)—The current differences between recorded intensities and energies between adjacent pixels as determined by the method steps (i) and (ii) are compared;

Step (v)—Following the method steps (i) to (iv) for at least one known material and storing the differences in a database; and Step (vi)—Comparing the differences between recorded intensities for a substance under test with the differences between recorded intensities for known substances from the database.

In this specification the term X-ray shall be considered also to be a reference to gamma rays.

The fact that certain measures are recited in mutually different dependent claims does not indicate that a combination of these measures cannot be used to advantage. Furthermore, features of one embodiment illustrated and/or described may be incorporated with features of one or more other embodiments where the possibility of such incorporation would be evident to one skilled in the art.

The invention claimed is:

1. An x-ray/gamma-ray imaging apparatus, the apparatus including a pulse mode x-ray/gamma-ray detector having a dynamic range and comprising a member that is pixelated and configured to convert incident x-ray/gamma-ray wavelength photons directly into an electronic signal, a position for a material under test, an x-ray/gamma-ray source, and a structure configured to perturb an x-ray/gamma-ray energy spectrum, each lying on a common axis, wherein the structure comprises at least three regions adjacent and to the side of each other, each different from each other and having a different x-ray perturbing characteristic, and wherein said structure lies between the x-ray/gamma-ray source and the member and to one side of the position for material under test, the said structure intersecting the common axis such that x-ray/gamma-ray photons perturbed differently by respective regions of the at least three regions of said structure impinge upon different pixels of the pixelated detector substantially simultaneously, and wherein by means of the different perturbation characteristics of the at least three regions of the structure at least some of the pixels of the pixelated detector are impinged upon by x-ray/gamma-ray photons that are within the dynamic range of the detector.

2. An x-ray/gamma-ray imaging apparatus according to claim 1, wherein the at least three regions lie laterally of one another.

3. An x-ray/gamma-ray imaging apparatus according to claim 2, wherein the at least three regions lie laterally of one another in two orthogonal directions.

4. An x-ray/gamma-ray imaging apparatus according to claim 1, wherein at least three regions of the structure are formed in an array.

5. An x-ray/gamma-ray imaging apparatus according to claim 4, wherein the array comprises an x by y array wherein the multiple of x and y is greater than or equal to three.

6. An x-ray/gamma-ray imaging apparatus according to claim 4, wherein the array repeats itself in the structure.

7. An x-ray/gamma-ray imaging apparatus according to claim 4, wherein the structure includes a multiplicity of arrays.

8. An x-ray/gamma-ray imaging apparatus according to claim 1, wherein individual regions each include one or more x-ray/gamma-ray perturbation elements.

9. An x-ray/gamma-ray imaging apparatus according to claim 8, wherein the x-ray/gamma-ray perturbation elements are one of the same and different.

10. An x-ray/gamma-ray imaging apparatus according to claim 1, wherein the structure is one of planar and non-planar.

11. An x-ray/gamma-ray imaging apparatus according to claim 10, wherein the structure is curved in at least one plane.

12. X-ray/gamma-ray imaging apparatus according to claim 1, wherein the structure is configured to perturb both the energy distribution and the intensity of the x-ray/gamma-ray energy spectrum.

13. An x-ray/gamma-ray imaging apparatus according to claim 1, wherein the difference between adjacent regions of the structure includes the thickness of the material of the structure in adjacent regions.

14. An x-ray/gamma-ray imaging apparatus according to claim 13, wherein the thickness of the region changes continuously across the structure in at least one direction.

15. An x-ray/gamma-ray imaging apparatus according to claim 14, wherein the thickness of the region changes continuously across the structure in two orthogonal directions.

16. An x-ray/gamma-ray imaging apparatus according to claim 1, wherein the difference between adjacent regions includes the material from which the individual adjacent regions of the structure are formed.

17. An x-ray/gamma-ray imaging apparatus according to claim 13, wherein the individual regions of the structure include discrete layers.

18. An x-ray/gamma-ray imaging apparatus according to claim 17, wherein the discrete layers differ and the difference between discrete layers is selected from the group comprising the thickness of the discrete layers between regions; the thickness of the discrete layers within a region; the material from which the discrete layers are formed differs between regions; the material from which the discrete layers are formed differs within a region; the number of discrete layers differs between regions; and the number of discrete layers differs within a region.

19. An x-ray/gamma-ray imaging apparatus according to claim 17, wherein the structure includes a plurality of discrete layers and at least one of the discrete layers includes at least one aperture.

20. An x-ray/gamma-ray imaging apparatus according to claim 19, wherein a plurality of the discrete layers include at least one aperture and wherein apertures of different layers within the structure are of different dimensions.

21. An x-ray/gamma-ray imaging apparatus according to claim 19, wherein the discrete layers are formed of foil.

22. An x-ray/gamma-ray imaging apparatus according to claim 1, wherein the structure is configured to perturb the count rate whilst preserving the energy distribution of the x-ray/gamma-ray energy spectrum.

23. An x-ray/gamma-ray imaging apparatus according to claim 22, wherein the structure is a collimator, each of the at least three regions of the structure comprises an aperture of a different size to an aperture of an immediately adjacent region, wherein adjacent apertures are separated by an x-ray/gamma-ray absorbing material and the structure providing at least two different sizes of aperture.

24. An x-ray/gamma-ray imaging apparatus according to claim 23, wherein the structure comprises a plate of x-ray/gamma-ray absorbing materials have said apertures formed therein.

25. An x-ray/gamma-ray imaging apparatus according to claim 22, wherein the structure is formed from a selected one of tungsten, gold or lead.

26. An x-ray/gamma-ray imaging apparatus according to claim 22, wherein the said apertures are formed in the structure by spark erosion.

27. An x-ray/gamma-ray imaging apparatus according to claim 1, further including means for generating absorption edges and fluorescence peaks in the x-ray/gamma-ray energy spectrum.

28. An x-ray/gamma-ray imaging apparatus according to claim 27, wherein the means for generating absorption edges and fluorescence peaks in the x-ray/gamma-ray energy spectrum is comprised in the structure.

29. An x-ray/gamma-ray imaging apparatus according to claim 28, wherein the at least three regions of the structure each have a different absorption edge and fluorescence peak.

30. A structure suitable for use in an x-ray/gamma-ray detector according to claim 1, the structure configured to perturb an x-ray/gamma-ray energy spectrum incident thereon, the structure comprising at least three regions adjacent each other lying on a common plane, wherein each region is different from each other, each adjacent region configured to perturb the x-ray/gamma-ray energy spectrum differently.

31. A structure according to claim 30, wherein the structure includes a plurality of protrusions or depressions, the thickness of said protrusions or depressions changing in at least one direction thereof, each protrusion or depression providing at least three adjacent regions configured to perturb the x-ray/gamma-ray energy spectrum.

32. A structure according to claim 31, wherein the protrusions or depressions are pyramidal in shape.

33. A structure according to claim 31, wherein the structure comprises a non-metallic layer having a multiplicity of depressions formed therein, each depression filled with metal.

34. A structure according to claim 33, wherein the structure comprises a first non-metallic layer having a multiplicity of depressions formed therein and a second metallic layer including a corresponding number of protrusions each protrusion filling a corresponding depression.

35. A structure according to claim 34, wherein the second layer covers the surface of the first layer in which the openings to the depressions are situated.

36. A structure according to claim 31, wherein adjacent depressions or protrusions are separated from one another by x-ray/gamma-ray perturbing material and wherein the material separating adjacent depressions or protrusions constitute one of the at least three regions.

37. A structure according to claim 33, wherein the non-metallic layer is formed of silicon.

38. A method of determining a material property of a substance comprising the steps of:
a) positioning the substance in an x-ray/gamma-ray imaging apparatus as claimed in claim 1;
b) causing the x-ray/gamma-ray source to direct an x-ray/gamma-ray energy spectrum along the common axis;
c) analyzing electronic signals emitted by the member configured to convert incident x-ray/gamma-ray wavelength photons into electronic signals; and
d) deleting those electronic signals outwith the dynamic range of the member.

39. A method according to claim 38, wherein the member is pixilated, the method comprising the further step of analyzing the electronic signal for each pixel; and deleting those electronic signals outwith the dynamic range of the member.

40. A method according to claim 39, comprising the further step of assigning to each pixel of the member where the electronic signal has been deleted, the electronic signal of an adjacent pixel that is within the dynamic range of the member.

41. A method according to claim 39, comprising the further step of assigning to each pixel of the member where the electronic signal has been deleted, an electronic signal that is one of: interpolated and extrapolated, from the electronic signals of surrounding pixels.

42. A method according to claim 40, wherein the pixel from which an electronic signal is selected, interpolated or extrapolated is a nearest neighbor or nearest neighbor associated with a region having the same material properties.

43. An x-ray/gamma-ray imaging apparatus, the apparatus including a pulse mode x-ray/gamma-ray detector having a dynamic range and comprising a member that is pixelated and configured to convert incident x-ray/gamma-ray wavelength photons directly into an electronic signal, a position for a material under test, an x-ray/gamma-ray source, and a structure configured to perturb an x-ray/gamma-ray energy spectrum, each lying on a common axis, wherein the structure comprises at least three regions adjacent and to the side of each other, each different from each other and having a different x-ray perturbing characteristic, and wherein said structure lies between the x-ray/gamma-ray source and the member and to one side of the position for material under test, the said structure intersecting the common axis such that x-ray/gamma-ray photons perturbed differently by respective regions of the at least three regions of said structure impinge upon different pixels of the pixelated detector substantially simultaneously, and wherein by means of the different perturbation characteristics of the at least three regions of the structure at least some of the pixels of the pixelated detector are impinged upon by x-ray/gamma-ray photons that are within the dynamic range of the detector further comprising image processing software and a data processor, the image processing software configured to perform the method steps of:

a) positioning the substance in the x-ray/gamma-ray imaging apparatus;

b) causing the x-ray/gamma-ray source to direct an x-ray/gamma-ray energy spectrum along the common axis;

c) analyzing electronic signals emitted by the member configured to convert incident x-ray/gamma-ray wavelength photons into electronic signals; and d) deleting those electronic signals outwith the dynamic range of the member.

44. An x-ray/gamma-ray imaging apparatus according to claim 43, further including a database.

45. An x-ray/gamma-ray imaging apparatus according to claim 43, further including a data recording means.

* * * * *